US012803841B2

(12) United States Patent
Barry et al.

(10) Patent No.: US 12,803,841 B2
(45) Date of Patent: Nov. 17, 2026

(54) DETECTION OF PROXIED NETWORK CONNECTIONS

(71) Applicant: LUMINOUS CYBER CORP., Santa Clara, CA (US)

(72) Inventors: Charles F. Barry, Santa Clara, CA (US); John E. Hopwood, Albany, CA (US); James E. Garbagnati, Union City, CA (US)

(73) Assignee: LUMINOUS CYBER CORP., Santa Clara, CA (US)

( * ) Notice: Subject to any disclaimer, the term of this patent is extended or adjusted under 35 U.S.C. 154(b) by 272 days.

(21) Appl. No.: 18/417,744

(22) Filed: Jan. 19, 2024

(65) Prior Publication Data

US 2024/0250847 A1 Jul. 25, 2024

Related U.S. Application Data

(60) Provisional application No. 63/480,660, filed on Jan. 19, 2023.

(51) Int. Cl.
*H04L 12/46* (2006.01)
*H04L 43/0852* (2022.01)
(Continued)

(52) U.S. Cl.
CPC ...... *H04L 12/4641* (2013.01); *H04L 43/0858* (2013.01); *H04L 43/106* (2013.01); *H04L 67/02* (2013.01); *H04L 67/12* (2013.01)

(58) Field of Classification Search
CPC ............. H04L 12/4641; H04L 43/0858; H04L 43/106; H04L 67/02; H04L 67/12; H04L 41/16
See application file for complete search history.

(56) References Cited

U.S. PATENT DOCUMENTS 11,196,712 B1 12/2021 Norbutas
11,310,142 B1 * 4/2022 Boyce ..................... H04L 69/18
(Continued)

FOREIGN PATENT DOCUMENTS

CN 105791039 B 2/2019
CN 111464485 A 7/2020
(Continued)

OTHER PUBLICATIONS

Bagui, Sikha, et al. "Comparison of machine-learning algorithms for classification of VPN network traffic flow using time-related features." Journal of Cyber Security Technology 1.2 (2017): 108-126.

Crotti, Manuel, et al. "Traffic classification through simple statistical fingerprinting." ACM SIGCOMM Computer Communication Review 37.1 (2007): 5-16.

(Continued)

*Primary Examiner* — Kan Yuen

(74) *Attorney, Agent, or Firm* — Kramer & Amado, P.C.

(57) ABSTRACT

Methods, systems, and apparatus for detection of proxied network connections are disclosed. The methods, systems, and apparatus for detection of proxied network connections perform analysis of network packets observed in real-time, near real-time, or stored packet captures and/or reassembled payloads to identify if a particular network connection includes traversal of one or more proxied connections or tunnels from a client to a proxy server before being routed to the eventual endpoint. The methods, systems, and apparatus for detection of proxied network connections also perform analysis to provide a risk score to inform a policy that may block, challenge, or allow the connection.

20 Claims, 26 Drawing Sheets

(51) Int. Cl.

| | |
|---|---|
| ***H04L 43/106*** | (2022.01) |
| ***H04L 67/02*** | (2022.01) |
| ***H04L 67/12*** | (2022.01) |

(56) References Cited

U.S. PATENT DOCUMENTS

| | | | | |
|---|---|---|---|---|
| 11,310,162 | B2 | 4/2022 | Sreevalsan | |
| 2008/0059542 | A1* | 3/2008 | Atluri | G06F 11/1471 |
| 2009/0310500 | A1* | 12/2009 | Matsuda | H04L 43/0864 370/252 |
| 2014/0047543 | A1* | 2/2014 | Kim | H04L 63/1441 726/23 |
| 2015/0373039 | A1* | 12/2015 | Wang | H04L 63/1425 726/23 |
| 2016/0050224 | A1* | 2/2016 | Ricafort | H04L 63/1441 726/23 |
| 2018/0367620 | A1* | 12/2018 | Li | H04L 67/141 |
| 2020/0344213 | A1* | 10/2020 | Gorsica, IV | H04W 12/06 |
| 2022/0070065 | A1 | 3/2022 | Finn | |
| 2022/0100869 | A1* | 3/2022 | Berger | G06F 21/577 |
| 2022/0272127 | A1* | 8/2022 | Yawalkar | H04L 63/1433 |
| 2022/0329625 | A1 | 10/2022 | Ballew | |
| 2023/0254285 | A1 | 8/2023 | Henson | |
| 2023/0283537 | A1 | 9/2023 | Balaiah | |
| 2023/0379363 | A1 | 11/2023 | Chiapponi | |
| 2023/0379377 | A1* | 11/2023 | Gizis | H04L 12/4633 |
| 2023/0396556 | A1 | 12/2023 | Merlin | |
| 2024/0048493 | A1* | 2/2024 | Savarese | H04L 12/4641 |
| 2025/0047759 | A1* | 2/2025 | Parla | H04L 67/1012 |

FOREIGN PATENT DOCUMENTS

| | | | |
|---|---|---|---|
| CN | 114070602 | A | 2/2022 |
| CN | 112769633 | B | 8/2022 |
| CN | 118214573 | A | 6/2024 |
| WO | 2022/089765 | A1 | 5/2022 |

OTHER PUBLICATIONS

Draper-Gil, Gerard, et al. "Characterization of encrypted and vpn traffic using time-related." Proceedings of the 2nd international conference on information systems security and privacy (ICISSP). 2016.

He, Yanjie, and Wei Li. "A novel lightweight anonymous proxy traffic detection method based on spatio-temporal features." Sensors 22.11 (2022): 4216.

Janbeglou, Maziar, and Nevil Brownlee. "Identifying tunnelled proxies through passively monitoring network traffic." 2016 IEEE 18th International Conference on High Performance Computing and Communications; IEEE 14th International Conference on Smart City; IEEE 2nd International Conference on Data Science and Systems (HPCC/SmartCity/DSS). IEEE, 2016.

Weaver, Nicholas, et al. "Here be web proxies." International Conference on Passive and Active Network Measurement. Cham: Springer International Publishing, 2014.

Pannu, Mandeep, et al. "Exploring proxy detection methodology." 2016 IEEE International Conference on Cybercrime and Computer Forensic (ICCCF). IEEE, 2016. https://ieeexplore.ieee.org/abstract/document/7740438.

Ramesh, Reethika, et al. "{CalcuLatency}: Leveraging {Cross-Layer} Network Latency Measurements to Detect {Proxy-Enabled} Abuse." 33rd USENIX Security Symposium (USENIX Security 24). 2024. https://www.usenix.org/system/files/sec24summer-prepub-620-ramesh.pdf.

Rivera, Esteban, et al. "Risk-based authentication based on network latency profiling." Proceedings of the 13th ACM Workshop on Artificial Intelligence and Security. 2020. https://dl.acm.org/doi/abs/10.1145/3411508.3421377.

Springall, Andrew, Christopher DeVito, and Stephen Huang. "Per connection server-side identification of connections via Tor." 2015 IEEE 29th International Conference on Advanced Information Networking and Applications. IEEE, 2015. https://ieeexplore.ieee.org/abstract/document/9427688.

Tosun, Altug, et al. "RESIP host detection: identification of malicious residential IP proxy flows." 2021 IEEE International Conference on Consumer Electronics (ICCE). IEEE, 2021. https://ieeexplore.ieee.org/abstract/document/9427688.

* cited by examiner

Proxy Tunneled bidirectional connection to "Range server" endpoints:

1010

| id | sid | ip_str | label | slice_count | rtt_count | wb_len | ts |
|---|---|---|---|---|---|---|---|
| 41503 | 3b51e67c-5638-0eb7-e72b-000d6591ba9e | 73.15.176.249 | | 4677 csv | 1020 | 56.5 | 3/16/2022, 2:10:10 PM |

*API view showing User Session Metadata*

*API view showing Distributed Network Sensor locations and health status*

*DPNC Machine Learning Process*

1504

1504(a) 1504(b) 1504(c) 1504(d) 1504(e) 1504(f)

| client:client_port | rangeserver:port | direction | ts | ip_flags | tls_tokens |
|---|---|---|---|---|---|
| 40.83.151.150:45112 | 172.31.17.191.443 | in | 16198159721303 | SYN | |
| 40.83.151.150:45112 | 172.31.17.191.443 | out | 16198159721304 | SYN,ACK | |
| 40.83.151.150:45112 | 172.31.17.191.443 | in | 16198159721991 | ACK | |
| 40.83.151.150:45112 | 172.31.17.191.443 | in | 16198159722956 | PSH,ACK | CHL12 |
| 40.83.151.150:45112 | 172.31.17.191.443 | out | 16198159722957 | ACK | |
| 40.83.151.150:45112 | 172.31.17.191.443 | out | 16198159722984 | ACK | SHL12 [CERTF \|SRKEX |
| *packets removed* | | | | | |
| 40.83.151.150:45112 | 172.31.17.191.443 | out | 16198159726214 | RST | |
| 40.83.151.150:45476 | 172.31.17.191.443 | in | 16198159726219 | SYN | |
| 40.83.151.150:45476 | 172.31.17.191.443 | out | 16198159726220 | SYN,ACK | |
| 40.83.151.150:45476 | 172.31.17.191.443 | in | 16198159726913 | ACK | |
| 40.83.151.150:45476 | 172.31.17.191.443 | in | 16198159727586 | PSH,ACK | CHL12 |
| 40.83.151.150:45476 | 172.31.17.191.443 | out | 16198159727586 | ACK | |
| 40.83.151.150:45476 | 172.31.17.191.443 | out | 16198159727607 | ACK | SHL12 [CERTF \|SRKEX |
| *packets removed* | | | | | |
| 40.83.151.150:45476 | 172.31.17.191.443 | out | 16198159730879 | RST | |
| 40.83.151.150:45506 | 209.208.111.14:443 | in | 16198159730878 | SYN | |
| 40.83.151.150:45506 | 209.208.111.14:443 | out | 16198159730878 | SYN,ACK | |
| 40.83.151.150:45506 | 209.208.111.14:443 | in | 16198159731564 | ACK | |
| 40.83.151.150:45506 | 209.208.111.14:443 | in | 16198159732412 | PSH,ACK | CHL12 |
| 40.83.151.150:45506 | 209.208.111.14:443 | out | 16198159732412 | ACK | |
| 40.83.151.150:45506 | 209.208.111.14:443 | out | 16198159732435 | ACK | SHL12 [CERTF \|SRKEX |
| *packets removed* | | | | | |
| 40.83.151.150:45506 | 209.208.111.14:443 | out | 16198159735689 | RST | |
| 40.83.151.150:45542 | 209.208.111.14:443 | in | 16198159735689 | SYN | |
| 40.83.151.150:45542 | 209.208.111.14:443 | out | 16198159735689 | SYN,ACK | |
| 40.83.151.150:45542 | 209.208.111.14:443 | in | 16198159736373 | ACK | |
| 40.83.151.150:45542 | 209.208.111.14:443 | in | 16198159736790 | PSH,ACK | CHL12 |
| 40.83.151.150:45542 | 209.208.111.14:443 | out | 16198159736791 | ACK | |
| 40.83.151.150:45542 | 209.208.111.14:443 | out | 16198159736811 | ACK | SHL12 [CERTF \|SRKEX |
| *packets removed* | | | | | |
| 40.83.151.150:45542 | 209.208.111.14:443 | out | 16198159730879 | RST | |

packet

TCP handshake

Start of TLS handshake

1506 flow session network sensor

1502

*DPNC API GUI showing Metadata aggregations*

FIG. 15

*TLS State Diagram*

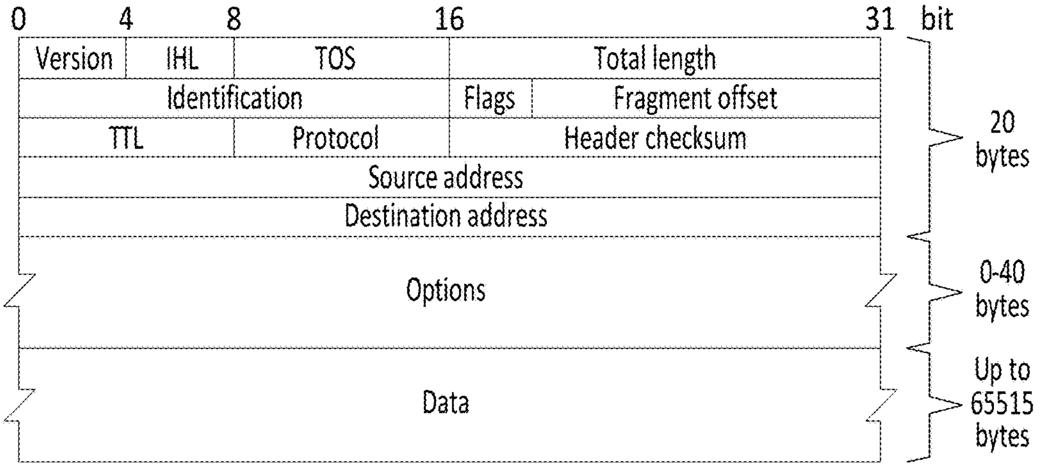

(a)https://en.wikipedia.org/wiki/Internet_Protocol_version_4#/media/File:IPv4_Packet-en.svg

FIG. 20a

IPv4 header format

<table>
<tr><td>Offsets</td><td>Octet</td><td colspan="8">0</td><td colspan="8">1</td><td colspan="8">2</td><td colspan="8">3</td></tr>
<tr><td>Octet</td><td>Bit</td><td>0</td><td>1</td><td>2</td><td>3</td><td>4</td><td>5</td><td>6</td><td>7</td><td>8</td><td>9</td><td>10</td><td>11</td><td>12</td><td>13</td><td>14</td><td>15</td><td>16</td><td>17</td><td>18</td><td>19</td><td>20</td><td>21</td><td>22</td><td>23</td><td>24</td><td>25</td><td>26</td><td>27</td><td>28</td><td>29</td><td>30</td><td>31</td></tr>
<tr><td>0</td><td>0</td><td colspan="4">Version</td><td colspan="4">IHL</td><td colspan="6">DSCP</td><td colspan="2">ECN</td><td colspan="16">Total Length</td></tr>
<tr><td>4</td><td>32</td><td colspan="16">Identification</td><td colspan="3">Flags</td><td colspan="13">Fragment Offset</td></tr>
<tr><td>8</td><td>64</td><td colspan="8">Time To Live</td><td colspan="8">Protocol</td><td colspan="16">Header Checksum</td></tr>
<tr><td>12</td><td>96</td><td colspan="32">Source IP Address</td></tr>
<tr><td>16</td><td>128</td><td colspan="32">Destination IP Address</td></tr>
<tr><td>20</td><td>160</td><td colspan="32" rowspan="3">Options (if IHL>5)</td></tr>
<tr><td>⋮</td><td>⋮</td></tr>
<tr><td>56</td><td>448</td></tr>
</table>

(b) https://en.wikipedia.org/wiki/IPv4#Packet_structure

FIG. 20b

TCP segment header

<table>
<tr><td>Offsets</td><td>Octet</td><td colspan="8">0</td><td colspan="8">1</td><td colspan="8">2</td><td colspan="8">3</td></tr>
<tr><td>Octet</td><td>Bit</td><td>7</td><td>6</td><td>5</td><td>4</td><td>3</td><td>2</td><td>1</td><td>0</td><td>7</td><td>6</td><td>5</td><td>4</td><td>3</td><td>2</td><td>1</td><td>0</td><td>7</td><td>6</td><td>5</td><td>4</td><td>3</td><td>2</td><td>1</td><td>0</td><td>7</td><td>6</td><td>5</td><td>4</td><td>3</td><td>2</td><td>1</td><td>0</td></tr>
<tr><td>0</td><td>0</td><td colspan="16">Source Port</td><td colspan="16">Destination port</td></tr>
<tr><td>4</td><td>32</td><td colspan="32">Sequence number</td></tr>
<tr><td>8</td><td>64</td><td colspan="32">Acknowledgement number (if ACK set)</td></tr>
<tr><td>12</td><td>96</td><td colspan="4">Data offset</td><td colspan="3">Reserved<br>000</td><td>N<br>S</td><td>C<br>W<br>R</td><td>E<br>C<br>E</td><td>U<br>R<br>G</td><td>A<br>C<br>K</td><td>P<br>S<br>H</td><td>R<br>S<br>T</td><td>S<br>Y<br>N</td><td>F<br>I<br>N</td><td colspan="16">Window Size</td></tr>
<tr><td>16</td><td>128</td><td colspan="16">Checksum</td><td colspan="16">Urgent pointer (if URG set)</td></tr>
<tr><td>20</td><td>160</td><td colspan="32" rowspan="3">Options (if data offset > 5. Padded at the end with "0" bits if necessary.)</td></tr>
<tr><td>⋮</td><td>⋮</td></tr>
<tr><td>60</td><td>480</td></tr>
</table>

(c) https://en.wikipedia.org/wiki/Transmission_Control_Protocol

FIG. 20c

*Multi-stage detection*

DETECTION OF PROXIED NETWORK CONNECTIONS

CROSS-REFERENCE TO RELATED APPLICATIONS

This application claims priority to U.S. Provisional Application No. 63/480,660, entitled DETECTION OF PROXIED NETWORK CONNECTIONS, filed on Jan. 19, 2023, the entire contents of which are hereby incorporated by reference.

BACKGROUND OF THE INVENTION

Field of the Invention

The present invention relates to network security generally, and in particular, to systems and methods for distinguishing legitimate network client connections from proxy connections and can assess a risk associated with such proxy connections.

Description of the Related Art

Enterprise software, crypto exchanges, traditional and emergent financial technology providers, and streaming content companies face an ever-increasing onslaught of online fraud and cyber-attacks on their critical systems, private data and content. Among the attack vectors are IP address spoofing and geolocation spoofing (geoshifting) enabled by proxied network access.

Proxy technologies provide online privacy, and security for network client connections to remote websites, applications, databases, and content. A proxy often provides a secure encrypted connection from the client to a remote proxy server that then acts on behalf of the client to forward packets to the destination endpoint. Example proxy technologies include, but are not limited to Virtual Private Networks (VPN), The Onion Router (TOR), etc.

A reputable, non-nefarious, client may use a proxy simply for privacy and security. However, nefarious clients may exploit proxies to access geographically restricted data, content, or streaming media, from outside the geographically restricted region. They may also use proxies to exploit regional price differences, i.e., to access content available at a lower price in a geographic region other than the users' actual geolocation. In addition to accessing streaming content, proxies can be used to evade geographical restrictions and regulations governing financial systems, cryptocurrency trading, gaming and lotteries, access confidential data records or personal identifying information, and to subvert or skirt data privacy protection regulations such as the European Union's General Data Protection Regulation (GDPR). Malicious attacks on critical infrastructure such as the 2021 Colonial Pipeline ransomware attack was perpetrated in part by accessing their systems using a VPN with leaked login credentials.

Proxies such as VPN and TOR provide a secure encrypted connection for the client's network traffic to provide online privacy, and security. The encrypted connection acts as a secure tunnel from the client to an endpoint. Typical scenarios include a laptop or mobile device client accessing the internet. A VPN client running on the client device establishes a secure encrypted connection to a remote VPN server. During the connection process, the VPN client is provided an IP address and the IP address of the associated VPN server. Once the VPN connection is established, the client presents its packets to the VPN client where it is encrypted and the encapsulated inside of an IPSEC packet. The packet is then forwarded to the remote VPN server, typically via The Internet. The VPN connection is also referred to as a VPN tunnel. These tunnels are very useful when a client is accessing the Internet from a public WIFI or access point. Since the client's packets are encrypted, the user is protected from inadvertently sharing passwords or even the websites or accessed IP locations. Upon arrival at the VPN server, the connection's packets are decrypted and forwarded to the intended recipient, e.g., a website, content distribution services, application, etc. In some cases, for even more privacy and security, multiple tunnels can be chained together, e.g., TOR, "Double-VPN", with each tunnel encrypted such that there is no one VPN server that has full knowledge of the full path or of the source IP and destination IP addresses.

Note that the VPN client's IP address is provided by the VPN service and is not associated with the client's original (untunneled) IP address. The VPN service may register a pool of IP addresses with organizations such as Internet Assigned Numbers Authority (IANA) or Asia Pacific Network Information Center (APNIC). IP address registration requires customer name and city/region served. By registering in multiple countries, or by obtaining access to IP registered in multiple countries, VPN services may appear to be in any continent, region, or city. Thus, the client using a VPN can take on the apparent location of any desired location that is supported by the VPN service. For instance, a client physically located in San Francisco can choose to connect to a VPN service with a server and IP address registered to Germany, France, or Italy, as desired. This IP geolocation spoofing is a major selling point of VPN connectivity and easily defeats today's IP location lookup database services.

Furthermore, VPN providers not only can spoof the IP address geolocation, but they also often physically place VPN servers in the spoofed location. This gives the VPN client the ability to have a secure, encrypted connection that provides both IP geolocation spoofing and the ability to make the connection appear as though it originated physically from within the country where the VPN server resides.

A related feature of VPN tunnels is that even though the tunneled packet may traverse many routers on its journey from the VPN client to the VPN server, the Time-To-Live (TTL) field in the client's tunneled IP packet is not decremented during its transit through the tunnel. Thus, when the packet is decrypted by remote VPN server, the forwarded packet has a TTL that appears much closer to the target country than to the client's originating county.

In addition, the system will often see better throughput and lower latency by having the server placed in or near to the target country, as opposed to routed elsewhere and then to the endpoint in the target country. Even further, some VPN providers implement TCP optimization functions to decrease round-trip latency and improve throughput. In summary, VPN proxy services have many methods that make it exceedingly difficult for the endpoint to determine if the connection is via a proxy and whence it originated.

Incumbent VPN detection methods typically use a database of information that has been associated with a particular IP address or set of IP addresses. The database may be a local copy provided by the database vendor or it may be accessible on the web via an API. In a typical use case, a web-based application may use the IP address of an incoming network connection to look up geolocation and proxy risk information for that IP address.

Incumbent IP database vendors build their databases by accumulating and associating information from a number of sources for a particular IP address or set or block of IP addresses. In building their databases, publicly available IP registration databases can be consulted. Domain Name Service (DNS) servers provide up to date information. In addition, many IP addresses can be scraped from websites. In many cases, VPN vendors provide configuration files that include their proxy IP address(es). In addition, IP database vendors may subscribe to VPN providers, make connections dynamically, and in so doing, learn the IP addresses.

Drive testing, wireless network sniffing, and other more manual ways may also be used to gather additional or more localized information about IP locations. These various sources may then be curated into a database that can then be consulted for geolocation and proxy determination.

VPN providers know, however, that their information can be gleaned over time, and many have adopted a "cat and mouse" game, to get around IP database VPN detection. Recent advances in proxy technology include ephemeral IP address lease, Residential VPN, and Proxy over VPN. Proxy providers can use ephemeral IP address to simply rotate through pools of IP addresses that they have acquired, and some of the more advanced providers change IP addresses on a per session basis, or even choosing to change IP addresses on a timed basis. Consequently, an IP address database quickly becomes stale and inaccurate. Now that IP addresses can be rotated per session or every few minutes, it makes it virtually impossible for a database to keep up to date with the proxy providers.

Residential VPN is an increasingly prevalent technique where a residential subscriber wittingly, or unwittingly, operates a VPN server in their home system. Potentially nefarious remote users connect to the residential VPN server and thus share the IP address and the bandwidth of the residential subscriber. Traditional IP address database systems cannot distinguish between the legitimate residential subscriber and the potentially nefarious VPN user and cannot block the access of the one without impacting the other.

Prior art IP database VPN detection cannot distinguish a legitimate subscriber from a Residential VPN subscriber since the IP address is the same for both. They can either mark the full IP address as suspect or not. This is a problem for the content provider as they typically do not want to block the legitimate subscriber, resulting in allowing both legitimate and VPN subscribers.

Thus, there is a need for improved systems and methods that can distinguish individual network flows that are legitimate from those flows that are via VPN.

SUMMARY OF THE INVENTION

The present invention addresses, among other things, the above-described problems in the prior art related to detection of proxied network connections and flows.

According to embodiments of the present invention, systems, and processes for Detection of Proxied Network Connections (DPNC) provide means to detect the presence of a proxy in the network connection path and to provide an indication or risk score.

According to embodiments of the present invention, proxy detection and generation of a risk score can be used to inform a policy to take action, e.g., to block, challenge or allow the connection. In some cases, the detection and risk score may be used to inform the user that the suspicious activity has been seen while still allowing the connection.

According to embodiments of the invention, rather than relying on the IP address of a connection, DPNC observes packets at various points located between the VPN server and endpoints distal to the client. Packet observation can be done in a number of ways, including, passive or active optical or electrical taps, in-line processing, port mirroring, Switched Port Analyzer (SPAN) or using a terminated network connection. Observed packets are processed by systems acting as "network sensors". Observation points may be located at one or more intermediate points between the server and the endpoints, co-located with the application server(s) endpoint(s), or the dedicated network sensors.

According to embodiments of the present invention, observed packets may be processed or analyzed in real-time, near real-time or may be post-processed from packets captures stored in memory, or in non-volatile storage.

According to embodiments of the present invention, a subset of the packet, called "a packet slice" can be used to process packets. The slice may be further processed into metadata or organized into a data structure with the desired fields of the packet.

According to embodiments of the present invention, a number of packet fields that include IP address, IP protocol and transport layer port fields, may be associated with each other to create a unique session ID that corresponds to a particular network flow, or set of related flows, between a client and one or more endpoints.

According to embodiments of the present invention, a system for detecting proxied network connections (DPNC) may include a plurality of network sensors, a software module and a DPNC server. The plurality of network sensors are coupled with an electronic data network and configured to receive network traffic including packets for a network connection, to extract metadata features from said packets, and to transmit the extracted metadata features. These features may be stored in a database and/or streamed directed to the DPNC server. The software module is adapted to be initiated by a client device, to generate network traffic from the client device to one or more of the plurality of network sensors. The DPNC server is configured to receive the extracted metadata features, to analyze the extracted metadata features and to determine whether the network connection was proxied based on a comparison of at least one of the extracted metadata features with an expected metadata feature, and to generate an indicator indicating a likelihood that said network connection is proxied.

The indicator may be a score and can allow another system to act on the score. For example, the output from the DPNC server could be messaged to an application server which could allow or block access based on the score.

According to embodiments of the present invention, the server may be configured to determine whether said network connection was proxied based at least on a calculation of latency for the packets relating said network connection and a comparison of the calculated latency with an expected latency.

According to embodiments of the present invention, the server may be configured to use a single stage or a multi-stage classification with a neural network or decision tree to determine whether said network connection was proxied.

According to embodiments of the present invention, a method for detecting proxied network connections (DPNC) is provided. The method may include a step of providing a software module configured to be initiated by a client device. When the software module is initiated, network traffic is generated from the client device to a plurality of network sensors coupled with an electronic data network and receives network traffic including packets for a network connection, extracts metadata features from said packets, and transmits the extracted metadata features. These features may be stored in a database and/or streamed directed to a DPNC server. The DPNC server receives the extracted metadata features, to analyze the extracted metadata features and determines whether the network connection was proxied based on a comparison of at least one of the extracted metadata features with an expected metadata feature. An indicator indicating a likelihood that said network connection is proxied can be generated.

Further features and advantages of the present invention will become apparent following review of the detailed description set forth below along with the accompanying figures.

BRIEF DESCRIPTION OF DRAWINGS

The novel features of the embodiments described herein are set forth with particularity in the appended claims. The embodiments, however, both as to organization and methods of operation may be better understood by reference to the following description, taken in conjunction with the accompanying drawings as follows.

FIG. 15 is a table illustrating the metadata aggregations per packet, per flow, per sensor and per session, according to embodiments of the present invention.

FIGS. 20(*a*)-(*c*) illustrate the IP Packet header format (a, b) and TCP Packet Header Format (c)

DETAILED DESCRIPTION OF THE PREFERRED EMBODIMENTS

Figure 1:
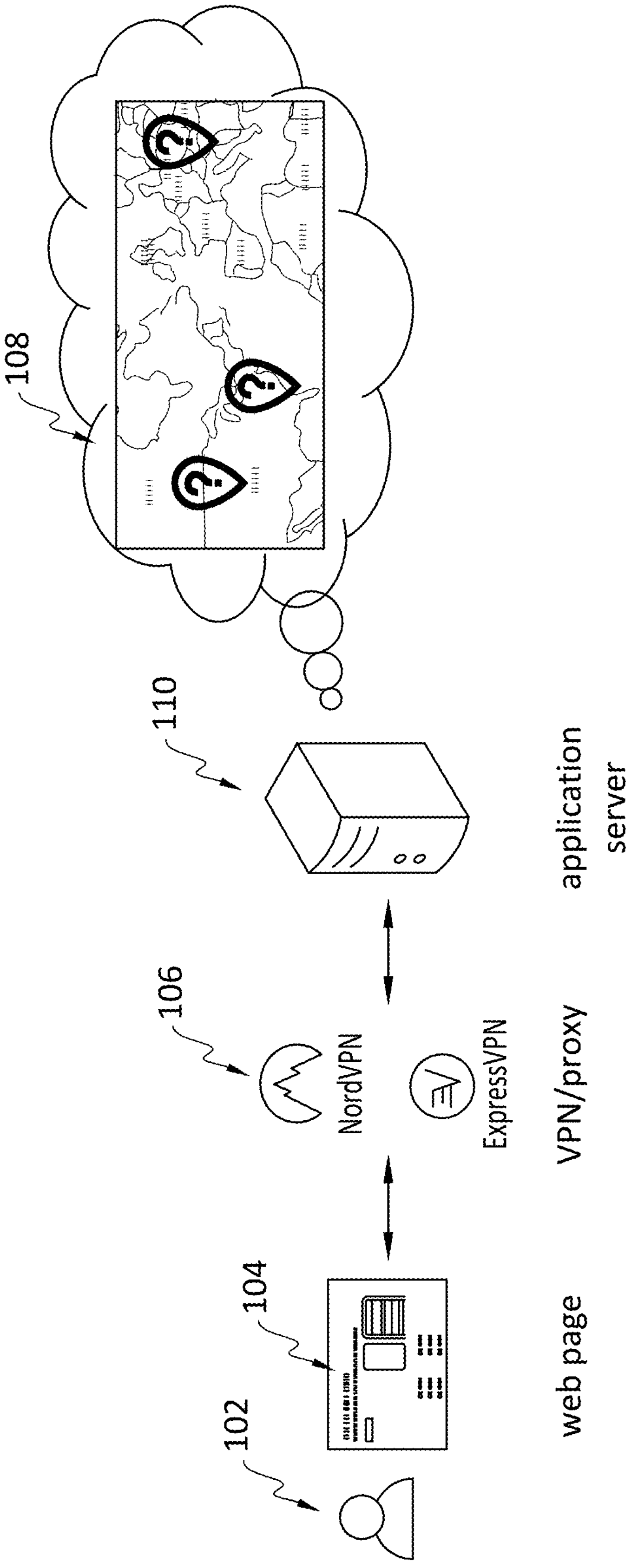
FIG. 1 is a diagram illustrating user access over a network via a proxy.

The following descriptions are presented to enable any person skilled in the art to create and use apparatuses, systems and methods described herein.

Reference will now be made in detail to several embodiments, including embodiments showing exemplary implementations of improved systems and methods for the detection of proxied network connections. Wherever practicable, similar or like reference numbers may be used in the figures and may indicate similar or like functionality.

In various embodiments, methods, systems, and apparatus for detection of proxied network connections are disclosed. In some embodiments, the systems, and methods for detection of proxied network connections comprise packet inspection, metadata generation, artificial intelligence for classification and detection with a cloud-based API to indicate the presence of a proxy. In some embodiments, the systems, and methods for detection of proxied network connections may provide VPN decisions and scoring in real-time. In some embodiments, the systems, and methods for detection of proxied network connections may provide VPN decisions and scoring in forensic detection from packet/stream captures.

A fundamental weakness of prior IP address database solutions is that they rely on the IP address as the key to lookup a result in a database. Instead of relying on the IP address of the connection, DPNC observes packets at various vantage points located between the VPN server and endpoints distal to the client. Packet observation can be done in a number of ways, including, passive or active optical or electrical taps, in-line processing, port mirroring, Switched Port Analyzer (SPAN) or using a terminated network connection. Observed packets are processed by systems or components acting as "network sensors". Observation points may be located at one or more intermediate points between the server and the endpoints, co-located with the application server(s) endpoint(s), or the dedicated network sensors.

Observed packets may be processed or analyzed in real-time (sub-second), near real-time (within seconds of transit) or may be post-processed from packets captures (packet copies) that are stored in memory, or in non-volatile storage, e.g., Solid State Drive or magnetic media. Note that the full content of each packet is not necessarily required. The full packet or a subset of the packet, called "a packet slice" is acceptable as long as the slice retains the required information for processing. The slice need not be contiguous bytes or bits of the packet, but can be selected fields such as IP addresses, IP Time to Live (TTL), TCP/UDP headers. The slice may be further processed into metadata or organized into a data structure with the desired fields of the packet. Regardless of observation method or location, the DPNC system requires packet slices to be timestamped at the time of observation. Timestamps need not be globally synchronized but are expected to be based a suitably stable clock counter with sub-millisecond resolution. The timestamp is not part of the packet itself, rather it is metadata associated with the packet slice. Similarly, the packet length is not part of the packet per se but is metadata that is associated with the packet slice.

Instead of using the IP address as its primary key for VPN detection, DPNC associates a number of packet field—an "n-tuple", including IP address, IP protocol and transport layer port fields with a session ID that corresponds to particular network flow, or set of related flows, between a client and one or more endpoint, called a "session." Each flow may be a Transmission Control Protocol (TCP), or Stream Control Transmission Protocol (SCTP) connection between a client and an endpoint. Flows may be initiated by the client device, or the endpoint device, and may transport higher network layer communications, such as HyperText Transfer Protocol Secure (HTTPS).

DPNC detects the presence of the proxy/VPN tunnel by analyzing the observed session flow(s). Flows that traverse a tunnel experience a number of packet processing and forwarding steps that may leave distinguishable alterations in packet data, values, format, counts, consistency, temporal or protocol sequencing, etc. DPNC's ability to learn and recognize the alterations is a fundamental, technical improvement over the current state of the art.

In addition, DPNC can distinguish between the flows of a legitimate subscriber at a location from those of a VPN subscriber sharing the legitimate subscriber's connection, even if the IP address and/or physical location is shared. This addresses Residential VPN subterfuge and is a further fundamental, technical improvement over the current state of the art.

Today's IP database VPN detection cannot distinguish the legitimate subscriber from the Residential VPN subscriber since the IP address is the same for both. Traditional IP database detection methods provide a risk score for the IP address per se, but not on a per-user or per-flow basis. This is a problem for the content provider as they typically do not want to block the legitimate subscriber, often resulting in allowing both legitimate and VPN subscriber. However, DPNC can make the distinction thus allowing selective handling by policy on a per-connection or per-flow basis even for a single subscriber IP address.

Network Connections using Proxy Servers

In computer networking, a proxy server is a server application that acts as an intermediary between a client requesting a resource and the server providing that resource. Instead of connecting directly to a server that can fulfill a requested resource, such as a file or web page, the client directs the request to the proxy server, which evaluates the request and performs the required network transactions. This serves as a method to simplify or control the complexity of the request, or provide additional benefits such as load balancing, privacy, or security. Proxies were devised to add structure and encapsulation to distributed systems. A proxy server thus functions on behalf of the client when requesting service, potentially masking the true origin or geolocation of the client requesting access to the resource server. See e.g., https://en.wikipedia.org/wiki/Proxy_server.

Virtual Private Networks (VPN) are a specific type and manner of providing a proxy connection. VPN proxy terminology is used hereafter. However, the methods, system and apparatus apply to general proxy connection types and not limited solely to VPN.

Types of VPNs

FIG. 1 depicts a network user "client" 102 accessing a remote server's website via a web browser 104, e.g., explorer, chrome, safari, Firefox, brave, etc. A user of client 102 may choose to access a website using a VPN service provider 106 such as EXPRESSVPN, NORDVPN, etc. The user typically first chooses a desired apparent location (illustrated with a cloud 108) in the VPN provider's application. The location may be a country, state, city, or different locations in the same city. e.g., USA, Los Angeles, California, USA, London, England, France, etc.

The VPN application looks for an available remote VPN server with an IP address associated with the desired apparent location. Although not strictly required, the VPN provider may choose a VPN server that is physically located in the desired apparent location. The VPN client establishes a secure encrypted connection to the VPN server, called a "tunnel". Once the tunnel is established, the user's system forwards packets (e.g., from the users' browser) to the VPN client and the VPN client in turn forwards packets through the VPN tunnel to the remote VPN server. The VPN server accepts packets from the VPN client, potentially requiring decryption and reassembly of the packets that were tunneled and forwards the reconstituted packets to the IP address of the application server endpoint 110, or destination.

The key point is that the user's actual IP address is never exposed by the VPN tunnel and the endpoint application only ever sees the proxied IP address. To the endpoint, the connection appears as though it comes from an IP address in the user's desired apparent location. Thus, a user in Los Angeles can use a VPN tunnel to appear to be in London, log in to their BBC account, and watch the content of their choosing. This issue is that the content is often geographically restricted, and the service provider can lose revenue or be fined for providing access to the content from outside the restricted geography. Similar restrictions apply to financial transactions, gaming, betting, medical records, and access to critical infrastructure.

There are a variety of VPN technologies, including OPENVPN (see, e.g., https://en.wikipedia.org/wiki/OpenVPN), IKEv2 (see, e.g., https://en.wikipedia.org/wiki/Internet_Key_Exchange), and proprietary technologies, e.g., NORDLYNX (NORDVPN) (see, e.g., https://support.nordvpn.com/General-info/1438624372/What-is-NordLynx.htm). In addition, the various VPN's often offer the option of a variety of network transport layer technologies, e.g., User Datagram Protocol (UDP) or Transmission Control Protocol (TCP) (see, e.g., https://en.wikipedia.org/wiki/User_Datagram_Protocol, https://en.wikipedia.org/wiki/Transmission_Control_Protocol).

Note that users are not limited to individual human users logging in to a website, and can be machines, applications, IoT devices, mobile devices, and other automata that desire to access a remote server, server process and/or its application and stored data, files, images, videos.

Heretofore the main method of detecting VPN connections has been to scrape VPN provider websites for their server IP addresses, obtain VPN accounts and cycle through connections and locations to learn their server IP addresses, and other forensic methods based on the IP address to develop a database that an application and lookup the likelihood of a VPN or proxy. The fundamental problem is that these incumbent methods rely on the IP address. The VPN provides know that the VPN detection services use these methods and so they regularly change their server IP addresses, in a game of cat and mouse.

The innovation driving the present invention is that DPNC does not rely on the IP address, but rather on the characteristics of the connection. Although the proxy is able to hide the IP address of the user, it must intercede between the user and the endpoint. In so doing, alterations are made in the way that the packets are handled, and these alterations are detectable by a Machine Learning system, e.g., Neural Network, Decision Tree, etc. According to embodiments of the invention, network sensors are used to analyze packet flows to detect and extract data relating to such alterations and to stream the data to a central server or database for further analysis. Based on such alterations, it can be determined whether a network session is proxied or not.

Figure 16:
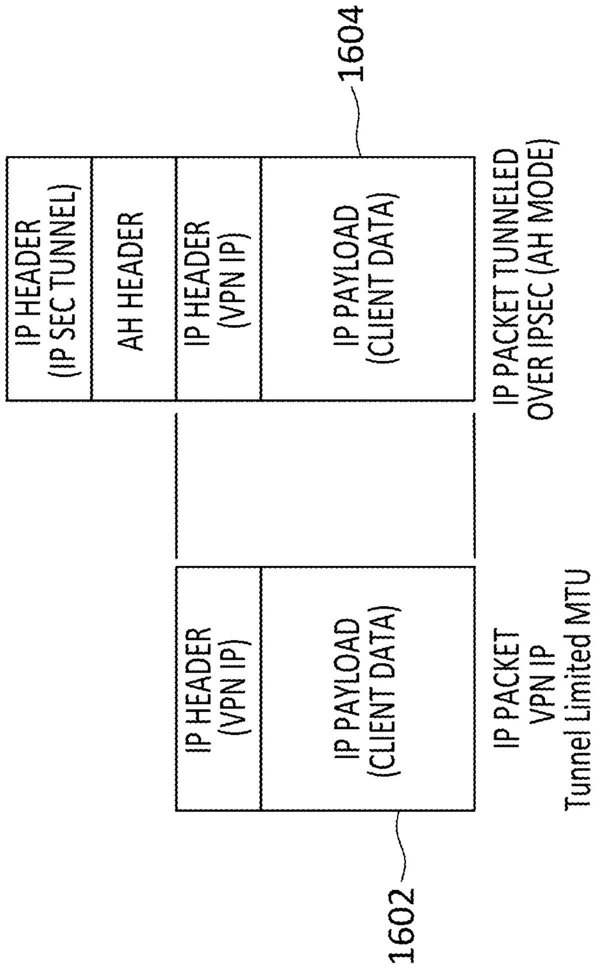
FIG. 16 is a diagram of a common proxy scenario to tunnel an IP packet using IPSEC in AH tunnel mode.
Figure 21:
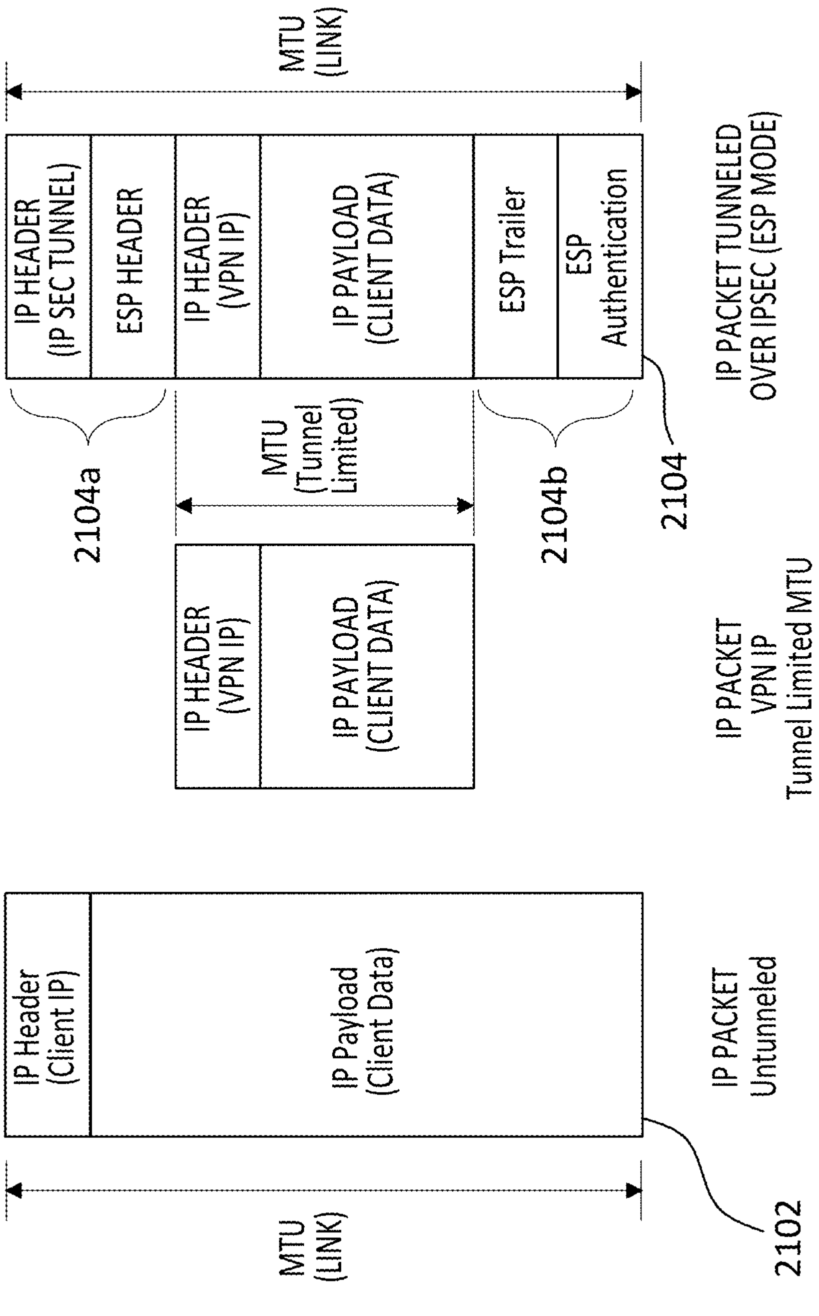
FIG. 21 illustrates the reduction in path MTU due to proxy/tunnel overhead bytes.

Physical networks typically limit the size of the largest packets to a "Maximum Transmission Unit", often on the order of 1500 Bytes (1500 B). Untunneled packets from a client are limited to no larger than the MTU size. When a tunnel is used, either the MTU presented to the client must be reduced to accommodate the overhead of the tunnel, or the client packets must be fragmented to not exceed the link MTU. In either case, the client packets are transported in a way that is different than that of an un-tunneled connection. FIGS. 16 and 21 show the overhead imposed by an IP SEC Authentication Header (AH) and Encapsulating Security Payload (ESP) tunnels, respectively.

At the egress of the VPN tunnel, the VPN server decrypts the packets and, in some cases, performs reassembly of packet payloads that were fragmented to fit within the MTU.

A packet traversing the VPN tunnel may be modified the VPN server and client processes and differ in several packet fields or bits from that of an untunneled packet. In addition, since the tunneled packets have a reduced MTU with respect to untunneled packets, may have altered MTU, there may be detectable alteration of inter-packet temporal variation, packets counts and packet order. Further, since the tunnel itself entails a bandwidth overhead and processing overheads, the throughput, latency, jitter, and packet loss of the tunnel may be different than that of an un-tunneled connection. The present invention can detect or measure such characteristics and compare it to expected characteristics for untunneled packets.

Maximum Segment Size (MSS) and Maximum Transmission Unit MTU are two limits on packet size. Packets can only reach a certain size (measured in bytes) before computers, routers, and switches cannot handle them. MSS is the size of maximum number of payload bytes in a packet of a TCP connection, while MTU measures the entire packet, including headers. Packets that exceed a network's MTU can be fragmented, or broken up into smaller packets, and then reassembled. Packets that exceed the MSS may be dropped by the endpoint or cause errors.

Figure 17:
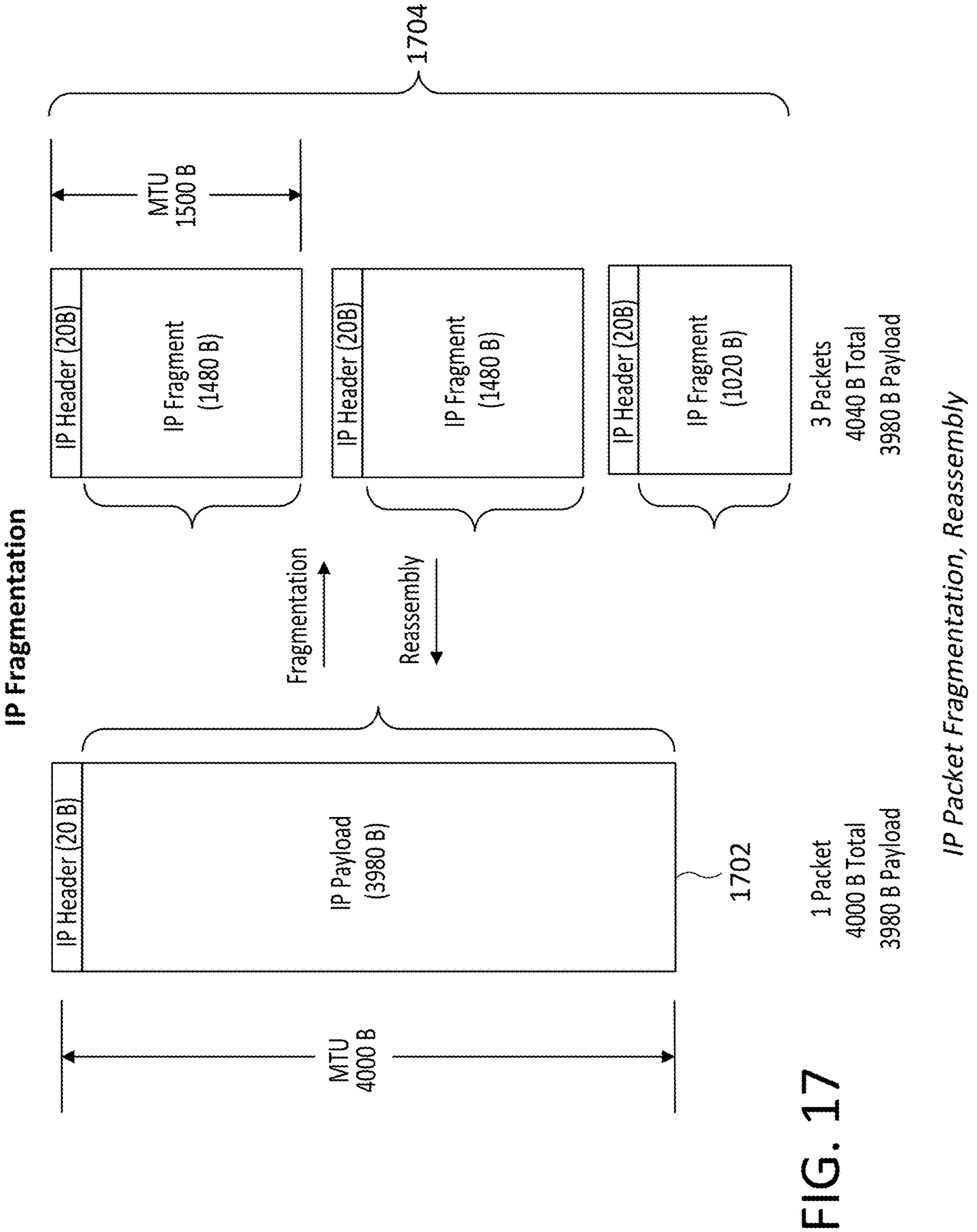
FIG. 17 is a diagram of the standard IP fragmentation process where a large datagram (i.e., larger than the MTU of the IPSEC Tunnel), is split into two (or more) smaller datagrams so as not to exceed the tunnel's MTU.
Figure 22:
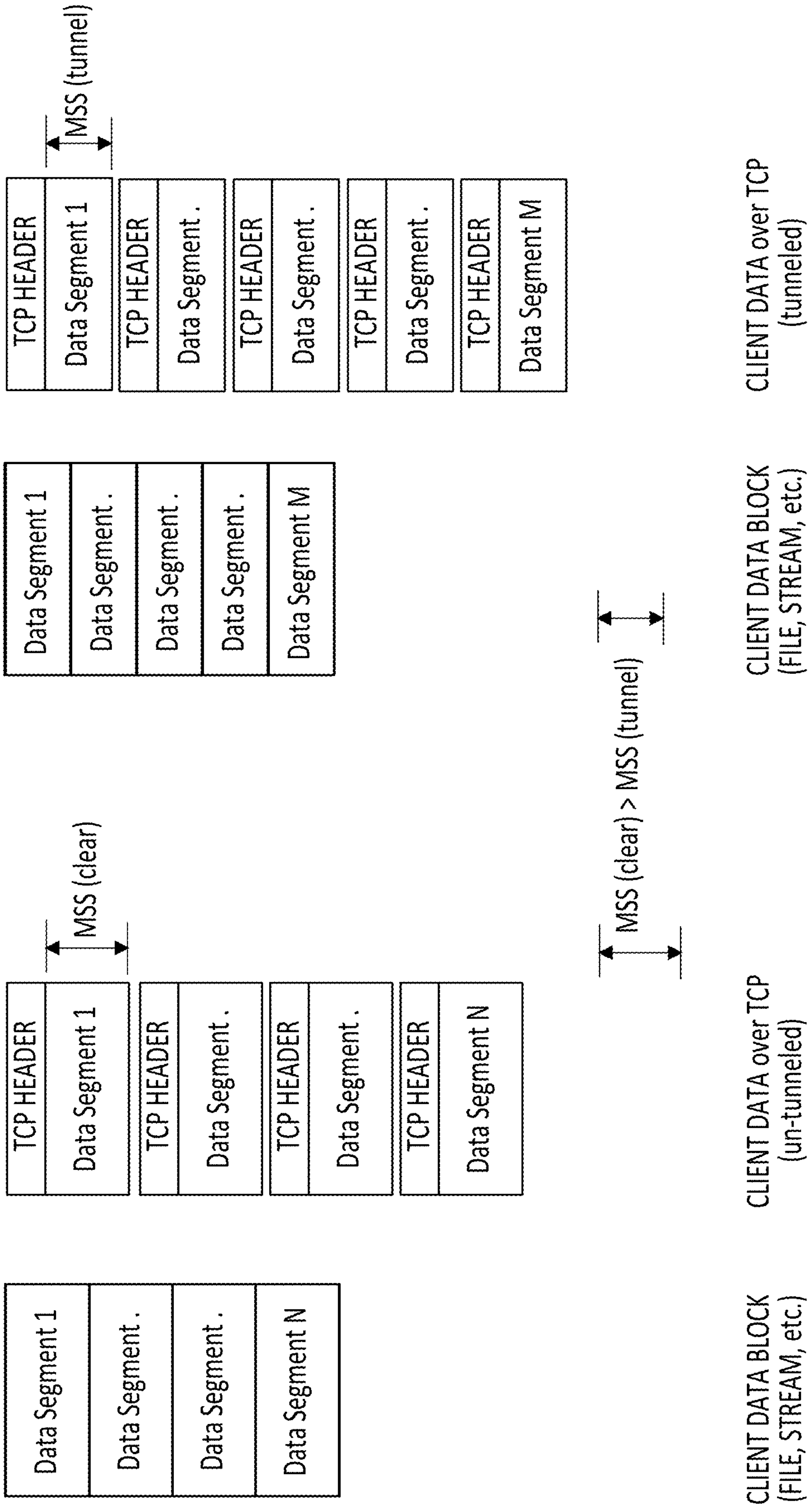
FIG. 22 illustrates reduction in TCP Maximum Segment Size (MSS) due to Proxy/Tunnel.

IPsec protocols add several headers and trailers to packets, all of which take up several bytes. For networks that use IPsec, either the MSS and MTU must be adjusted accordingly, or packets will be fragmented and slightly delayed. Usually, the MTU for a network is 1,500 bytes. A normal IP header is 20 bytes long, and a TCP header is also 20 bytes long, meaning each packet can contain 1,460 bytes of payload. However, IPsec adds an Authentication Header, or an ESP header, and other associated trailers. These may add 50-60 bytes to a packet, or more. FIG. 17, described below, shows fragmentation of a packet at the IP level. FIG. 22, described below, shows the impact of the tunnel on the Maximum Segment Size (MSS) at the Transport Control Protocol (TCP) later resulting in more packets in the tunnel than are at either side of the tunnel (user client side or remote proxied side). More packets mean more bandwidth, latency, loss in the tunnel. According to the present invention, such characteristics can be detected and used to determine whether a session is proxied or not.

Networks packets are comprised of a number of data fields including header(s), payload, and trailer(s). The header and trailer may in turn have many subfields. In the case of the IP header, the subfields include IP source and IP destination addresses. Networks are layered, with physical layers, media access control, network, transport, session, presentation, and application layers as per the Open Systems Interconnect (OSI) model, and often the payload of one layer is the full next higher layer that may encapsulate higher layers in turn. Each layer may have several versions such as IPv4 and IPv6 network layers, or several methods such as TCP, UDP and SCTP transport layers. For purposes here, the user payload is considered to be the payload of the transport layer. The various layer headers and their subfields are of special import for detection of proxied network connections. FIG. 20, described below, shows header structures and subfields for IPv4 and TCP protocols.

According to embodiments of the invention, DPNC includes observing the user packets on a connection-by-connection basis. An individual connection to an application is called a "flow," can be one-way (unidirectional), two-way (bidirectional) and in some cases broadcast or multicast (one to any or many). In the case of TCP or SCTP transport protocols, the connections are bidirectional. For our purposes, by convention, we label packets sent by the client to the endpoint as the "in" direction, and packets sent from the endpoint to the client as the "out" direction. Rather than processing entire packets with large payloads, according to embodiments of the invention, DPNC can process and analyze just the packet headers and further individual subfields. The information resulting from this processing are called "metadata features".

Metadata features may include packet size, packet count, packet header, packet order, packet size, packet and protocol header values, temporal values of the times of arrival (TOA) of packets and time differences of arrival (TDOA) of related packets of a stream, and the states of the TCP or other protocols used by the connection. The variations or anomalies of the metadata of tunneled connections with respect to un-tunneled connections are herein called "tells".

While any single one tell may be insufficient to detect the presence of the VPN, a combination of metadata feature\ and temporal tells can also be used to detect the presence of the VPN tunnel, and in most cases, may be more accurate.

According to embodiments of the invention, metadata features can be computed or extracted from packets for each connection or flow for all the packets of a stream over its duration, or a subset of the packets, e.g., an initial set of packets such as the initial TCP handshake and TLS handshakes. According to embodiments of the invention, network sensors may compute or extracted metadata features from packets it receives and stream the metadata features to a central database or service for further processing. An embodiment may sample packets subsets periodically over long-lasting connections to provide a semi-continuous testing.

According to embodiments of the invention. The DPNC process does not require all of the bytes of the packet and typically does not need the payload. The resulting packet slice may contain the some or all of the packet information, packet size and timestamp, and may be of fixed, limited, or variable length depending upon the fields selected to be in the slice.

In some embodiment, flows may be observed "mid-flight" between the remote VPN server and the application, rather than at or near the terminating end of the stream and the metadata from the mid-flight location(s) alone, or in concert with the network sensor provide metadata for the same flows.

Transport layer and upper layers such as TCP and Transport Layer Security (TLS) are governed by specific state machines. The state machines require that certain interactions must occur between the user and the endpoint. These interactions are not typically fully masked by the VPN. The presence of the proxy imposes subtle variations not just on the fields, but on the latency, jitter and loss over the VPN connection that may interact with the protocol state machines. The variations in the timing and behavior of the tunnels are detectable by machine learning methods.

More advanced VPN's may optimize tunnel performance by performing optimizations such as TCP Offload (see, e.g., https://en.wikipedia.org/wiki/TCP_offload_engine). TCP optimizations may include the rapid local completion of the TCP handshake without always requiring the full roundtrip. However, there are certain transactions, such as the exchange of encryption keys in Transport Layer Security (TLS) that require a full roundtrip delay that cannot be offloaded. The disparity in latency for offloaded and full roundtrip delays is a strong tell for a Machine learning method to tell that a proxy is present. In essence, advanced VPN's are more detectable by virtue of their ability to improve performance with respect to standard VPNs.

Detection of Proxied Network Connections Overview

FIG. 1 depicts a user accessing a remote application from a webpage on their laptop of computer. The user has a choice of proxy tunnel technologies and providers, e.g., NORDVPN, EXPRESSVPN, etc. The VPN tunnel provides anonymity to the user who may or may not be nefarious. The app server may be streaming media content that is only intended for viewing in a particular geographic region. For instance, Premier League Football is intended for viewers located in the United Kingdom. The VPN tunnel provider enables the user to mask their true location and make it appear to the application that the user is in the United Kingdom when in fact the user could be anywhere.

Distributed Detection of Proxied Network Connections Process

Figure 2:
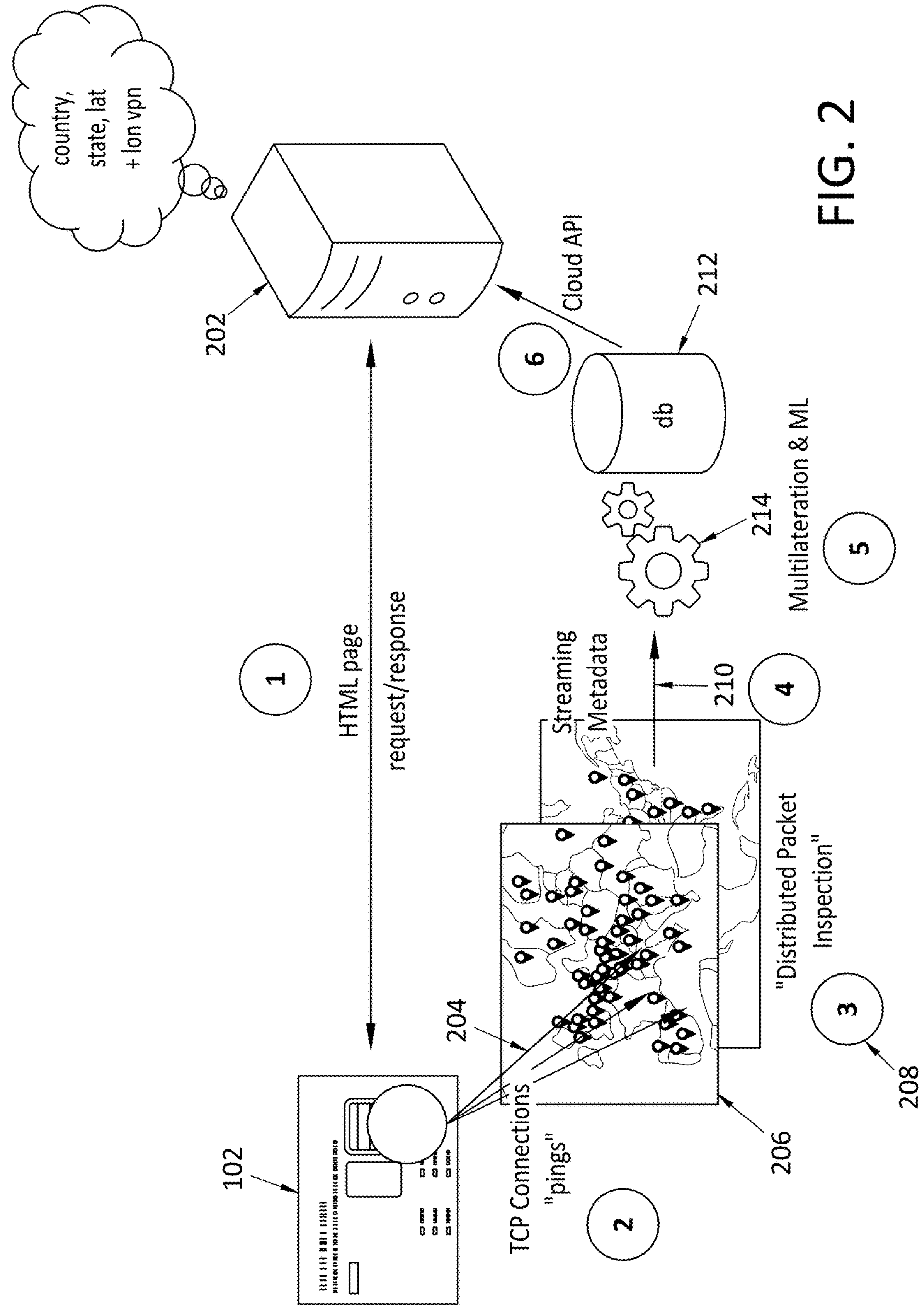
FIG. 2 is a high-level flow diagram illustrating DPNC according to embodiments of the present invention.

FIG. 2 is a block diagram illustrating features of the DPNC according to an embodiment of the invention. A user navigates to a website using a browser 102 running on their device, e.g., phone, laptop, computer, etc. Browser 102 can request (Step 1) the HTML page from the webserver 202 that responds (Step 1) with the page. The webpage includes a JavaScript library that is executed by the browser. A JavaScript library may be provided that is configured to initiate a set of TCP connections 204, HTTPS requests that use the TLS protocol, to one or more webservers running on a network sensor to retrieve an image file or "pixel" (step 2). The connections can include multiple, often short-lived TCP connections 204 ("flows") to each of a set of observation points 206, called "network sensors" or "network sensors". The set of all the TCP connections 204 initiated by the webpage to the network sensors 206 is called a session. Each network sensor 206 is configured to observe, and log (e.g., timestamp) TCP flow packets 204 and to perform deep packet inspection (Step 3) to derive metadata that includes timestamps, packet sizes, and values of the IP, TCP and TLS fields and values (208). Each network sensor 206 can stream the metadata for each session's flow to the metadata processing function, shown here as cloud-based servers 214. The VPN detection function is configured to process the real-time streaming metadata and may include heuristic, machine learning, and neural network processes. The VPN detection function may optionally provide a risk or confidence score. In this embodiment, the system also performs multilateration for geolocation of the accessor (step 5). The metadata and results for each session are stored in a database 212 that can be queried by and API (Step 6). In this case, the application (e.g., running on app server 202) that is accessed via the webpage makes the query, and depending upon the results, can then institute a policy that may include blocking, challenging, or allowing the access to the application.

Network sensors 206 may be the end point of the TCP flow 204, an intermediate packet forwarding device inspecting the packets in flight, or a monitoring system where packet copies have been directed (observation points). Network sensors 206 may be geographically distributed. Client flows 204 may be observed by any subset of observations points. VPN proxy detection can be performed using observations from a one or more observation point. Geolocation by way of multilateration or AI/ML typically entails observations of client flows from more than one observation point, though one observation point can suffice in certain scenarios. Since the network sensors 206 are distributed and inspect packets, this is termed Distributed Packet Inspection.

Users (client devices) can initiate a connection to a network resource, potentially via a proxy. The accessing process generates one or more network connections to one or more systems distributed over the network where the network connection is passively observed. In one embodiment, the network connection initiates a well-defined network action, such as an "HTTPS Get" to a server deemed "network sensor" that responds to the request in a normal fashion. The network sensor examines some or all of the packets of the connection, timestamps the packet arrival, extracts some or all of the packet contents to form metadata that could be all or some of the packet or its extracted fields, timestamps, size, and other parameters related to the packet and its contents, possibly also metadata that spans one or more packets such as an interpacket arrival time, connection state or inter-connection data. The metadata generation process can be split across multiple systems with the network sensor preforming some or all of the functions, and the detection server performing additional steps.

Untunneled User Access to Web Application

Figure 3:
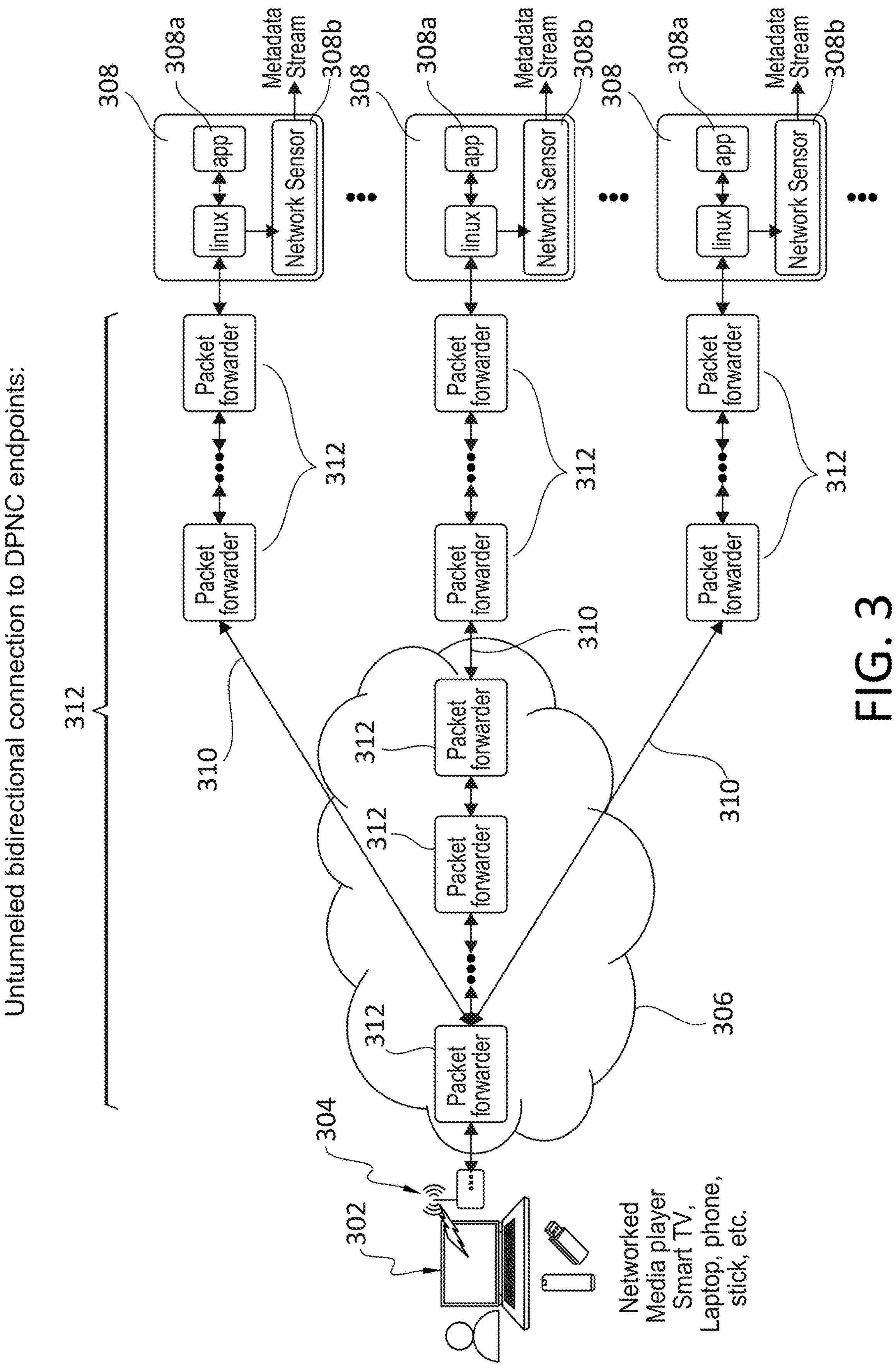
FIG. 3 is a process flow diagram illustrating DPNC according to embodiments of the present invention wherein network sensor(s) in potentially geographically diverse locations process traffic intentionally initiated by a client.

FIG. 3 is a flow diagram of untunneled bidirectional network connections to "network sensors." FIG. 3 depicts an embodiment of DPNC where a user accessing a network application or storage connects to the network from a client device 302, e.g., laptop, mobile phone, smartTV, USB stick, and then via a WIFI access router 304 to the internet 306. The client system invokes a DPNC function that, upon the users request to access content, initially, continuously, or periodically, connects to a process, here shown as an nginx process 308*a*, running on one or multiple endpoints called "network sensors" 308*b* located in one or more geographical locations, and shown here as executing on a CDN/App server 308. The client traffic 310 may be generated by way of a JavaScript library executed by the application's webpage running in the client device's (302) browser. Since these traffic connections 310 are initiated by the webpage (JavaScript library) it is called "intentional" traffic.

The network sensors 308*b* are configured to observe the exchange of packets and to process to deliver the full packet, or a subset of packet bytes called a "slice", and to deliver them to a network sensor 308*b* along with metadata that includes packet size and timestamp. The network sensor function may run in a physical server, virtual machine, or container. The network sensor 308*b* may also run in a physical server, virtual machine or container and may be co-located with the observing system or elsewhere in the network.

The paths 310 between the client 302 and the network sensors 308*b* are typically multi-hop, traversing a number of packet-forwarding devices 312, e.g., switches, routers, access points, multiplexers, radio links, cable modems, FTTH, xDSL, mobile networks. The paths 310 from the client 302 to the network sensors 308*b* typically diverge at some point(s) on their way to the different endpoints, especially when the network sensors 308*b* are geographically dispersed.

The network sensors 308*b* are configured to process the copied packets, slices, and packet metadata, to form metadata streams that are then processed to identify the presence of a proxy. In the example of FIG. 3, there is no proxy. Note that the multiple observed metadata streams 310 can be delivered from one or multiple network observation processes and can be load balanced from one-to-many network sensors 308*b*. In other words, there is no need for a 1:1 network observation process to network sensor relationship.

Tunneled User Access to Web Application

Figure 4:
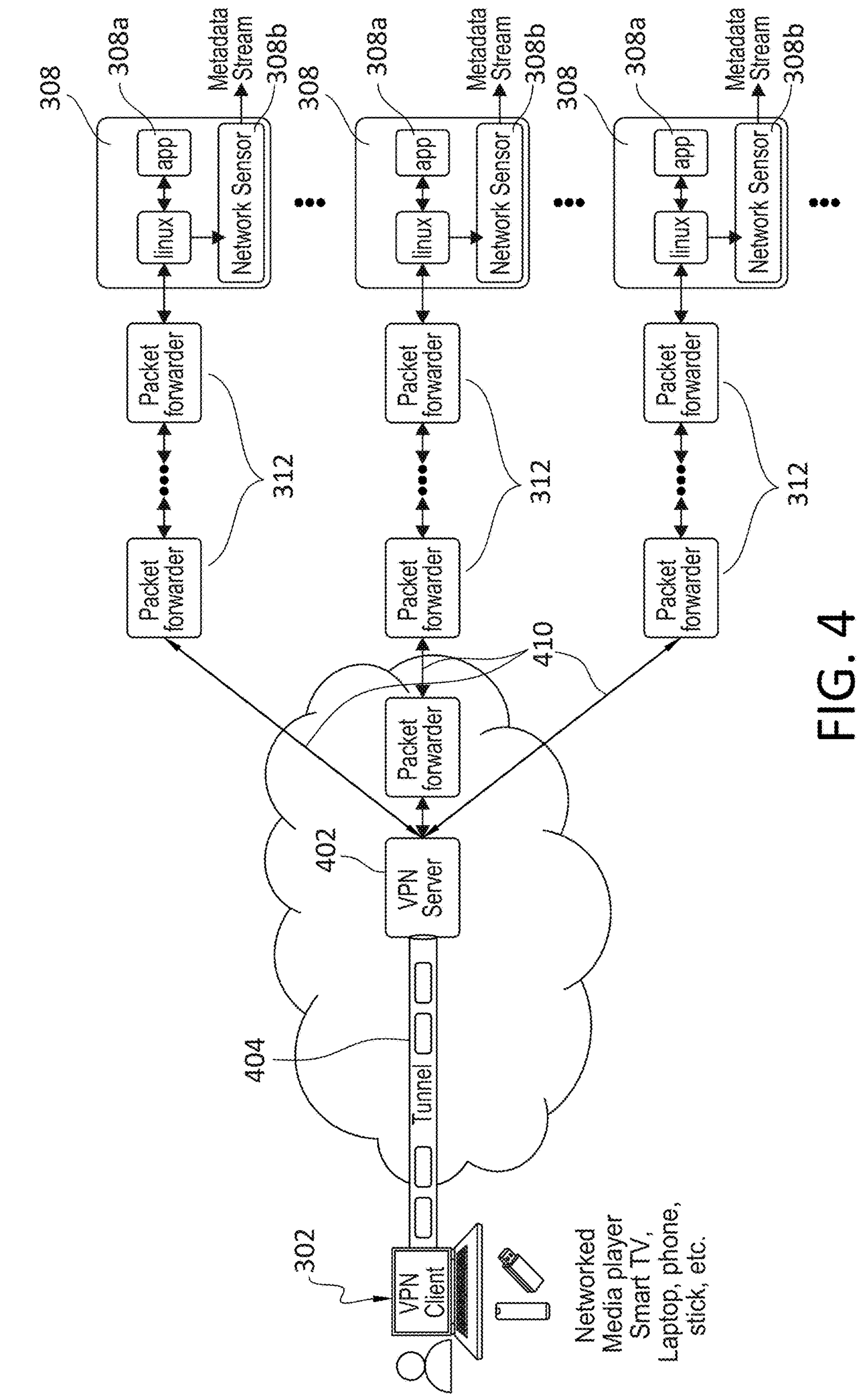
FIG. 4 is a process flow diagram illustrating DPNC according to embodiments of the present invention wherein the client traffic is traversing a proxy tunnel and the packets at the network sensor endpoints.

FIG. 4 depicts an embodiment of DPNC where a user uses a proxy tunnel to access a network application or storage connects to the network from a laptop, mobile phone, smartTV, USB stick and then via a WIFI access router to the internet. In this case, the proxy establishes an encrypted connection from the accessing device 302, e.g., laptop, mobile phone, smartTV, USB stick, to a remote proxy server 402, the "tunnel" 404. The proxy server 402 terminates the tunnel 404, if necessary decrypts and reassembles the user's packets, and delivers the user's traffic to the endpoints as though they originated physically from the proxy server location and with the IP address provided by the proxy service. In this case, the paths 410 from a VPN server to the network sensors typically diverge at some point(s) on their way to the different endpoints, especially when the network sensors 308*b* (executing on server 308) are geographically dispersed. Note that the tunnel 404 itself may have a number of packet-forwarding devices (not shown). Tunneled packet forwarding devices are not directly visible to the endpoints; the connection appears to emanate from the proxy server 402.

Untunneled User Access to CDN/App Server(s)

Figure 5:
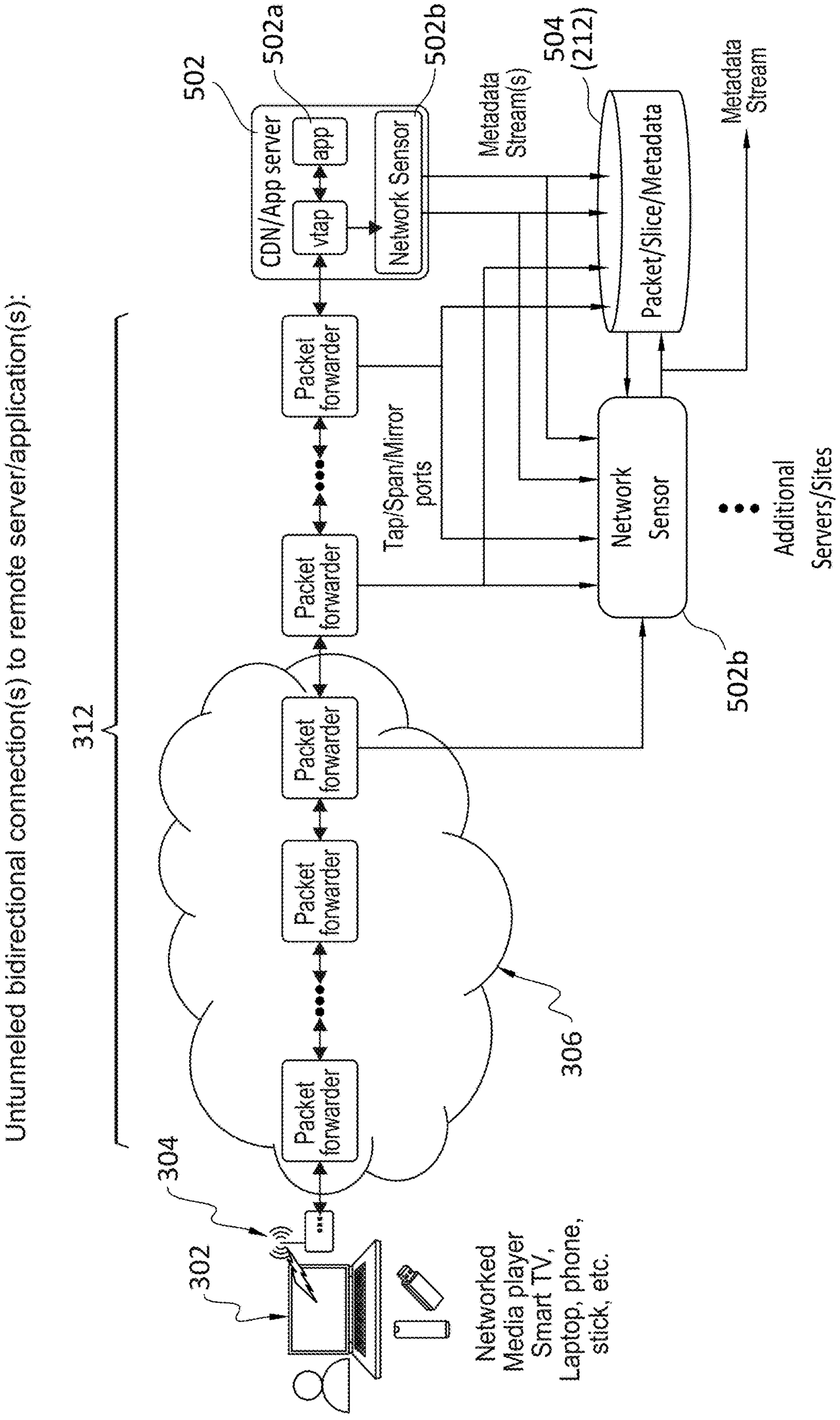
FIG. 5 is a diagram illustrating DPNC according to embodiments of the present invention where network sensor(s) process traffic opportunistically observed between the client and application sensor(s) in potentially geographically diverse locations.

FIG. 5 depicts an embodiment of DPNC wherein the network traffic is the client's (302) application's traffic, in this case the media streams served by servers in a Content Distribution Network (CDN). This is called "opportunistic" traffic. Although one App server 502 instance is shown in the figure, CDNs can serve media from multiple servers, possibly geographically distributed in parallel or sequential and where the client 302 is connected to multiple servers simultaneously or over time. The traffic may be observed at the several CDN App servers 502 hosting an application 502*a*, for instance in the kernel, or by virtue of a network tap function in a virtual switch interconnecting virtual machines. The network sensor function 502*b* may run in a physical server (shown here on both a CDN server 502 and as a stand alone network sensor server 502*b*, to the left of database 504), virtual machine, or container. In addition, connection packets may be copied to network sensor(s) 502*b* from physical packet-forwarding devices 312 anywhere in the connection path between the proxy server (not shown), including the possibility of multiple locations. The packet copies may arrive via a passive or active optical, electrical or RF tap, port mirror or SPAN port. Packet copies may be accompanied by additional metadata such as length, port, location information, or timestamp. The copied information may be the full packet or packet slices. Packets, slices, or metadata streams may be copied to multiple sensors 502*b* for load balancing, redundancy, and reliability. The packets, packet slices and/or metadata may also be stored in memory 504 or storage device for near real-time or forensic proxy detection or other analytics.

As in the case of intentional traffic, when the opportunistic traffic from the client in untunneled, the paths from the client to the network sensors typically diverge at some point(s) on their way to the different application endpoints, especially when the application servers are geographically distributed. As shown, metadata may be stored in the database 504 and/or streamed to a remote DPNC server (not shown) for processing according to embodiments of the invention.

Tunneled User Access to CDN/App Server(s)

Figure 6:
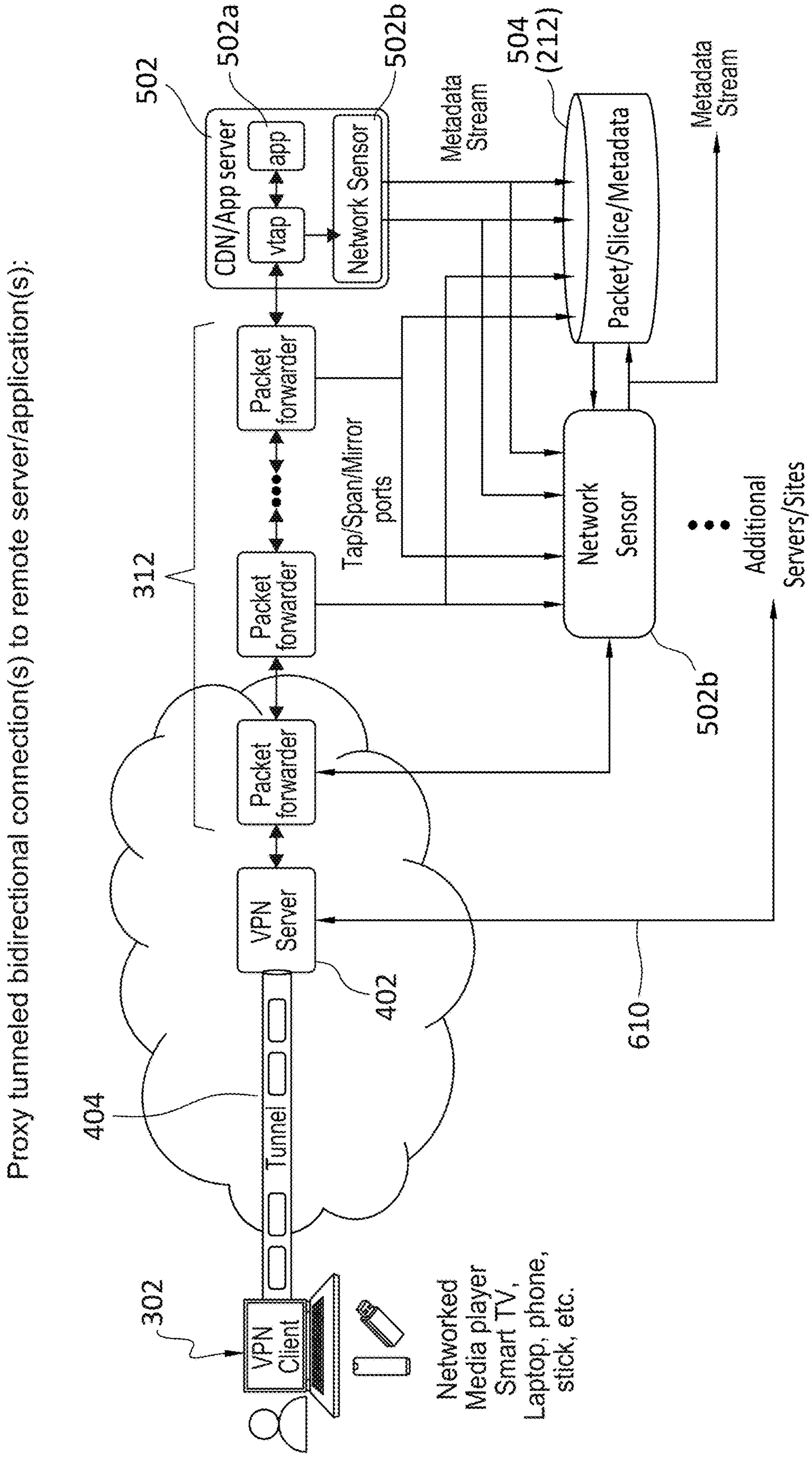
FIG. 6 is a diagram illustrating DPNC according to embodiments of the present invention where the client traffic is traversing a proxy tunnel and the packets are observed on the network segments between the VPN server and application server endpoints.

FIG. 6 depicts the previous embodiment in the case when the client 302 connects via a proxy tunnel 404. The proxy server 402 terminates the tunnel 404, processes the proxy packets and delivers the user's traffic to the application endpoints as though they originated physically from the proxy server location and with the IP address provided by the VPN service. In this case, the paths 610 from the proxy server 404 to the applications servers 502 typically diverge at some point(s) on their way to the different endpoints, especially when the application servers 502 are geographically dispersed. Note that the tunnel 404 itself may have a number of packet-forwarding devices (not shown). Packet-forwarding devices in the tunneled path are not directly visible to the endpoints; the connection appears to emanate from the proxy server 402.

The traffic may be observed at the several CDN App servers 502, for instance in the kernel, or by virtue of a network tap function in a virtual switch interconnecting virtual machines. The network sensor function 502*b* may run in a physical server, virtual machine, or container. In addition, connection packets may be copied to network sensor(s) 502*b* from physical packet forwarding devices 312 anywhere in the connection path between the proxy server (not shown), including the possibility of multiple locations. The packet copies may arrive via a passive or active optical, electrical or RF tap, port mirror or SPAN port. Packet copies may be accompanied by additional metadata such as length, port, location information, or timestamp. The copied information may be the full packet or packet slices. Packets, slices, or metadata streams may be copied to multiple sensors 502*b* for load balancing, redundancy, and reliability. The packets, packet slices and/or metadata may also be stored in memory 504 or storage device for near real-time or forensic proxy detection or other analytics. Embodiments of DPNC may include both intentional and opportunistic traffic processing.

Proxy Detection Pipeline

Figure 7:
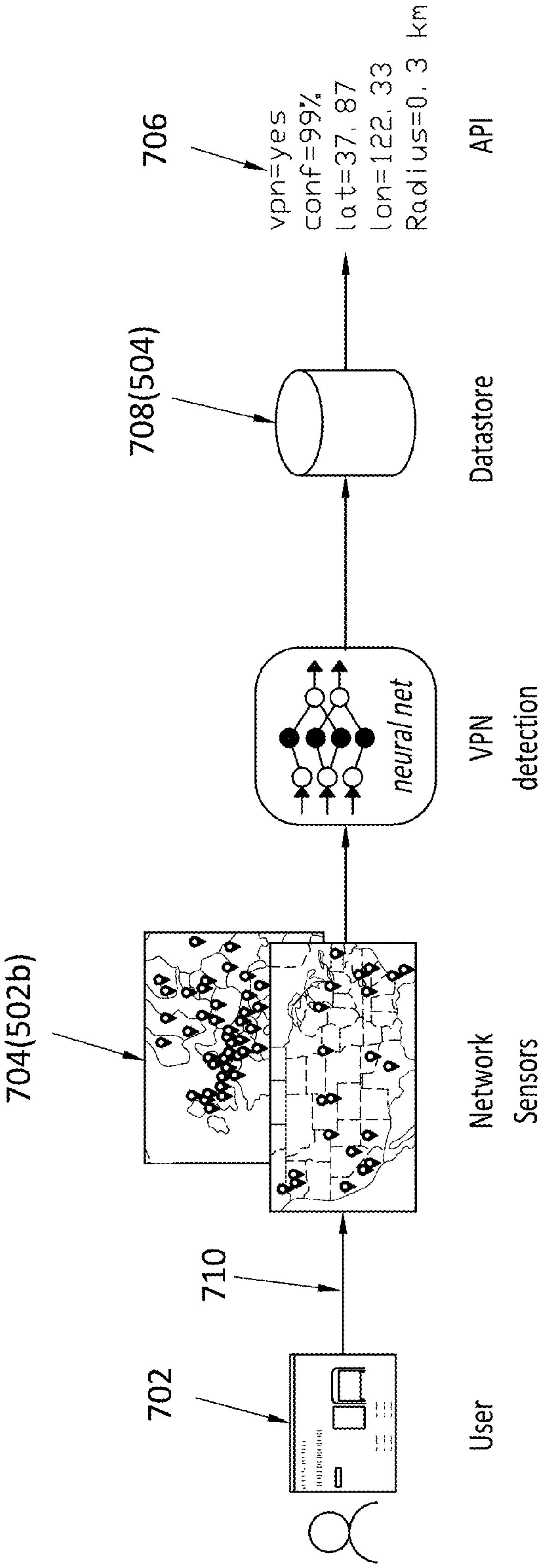
FIG. 7 is a high-level flow diagram illustrating DPNC according to embodiments of the present invention using a neural network.

FIG. 7 is a high-level flow diagram illustrating one embodiment of DPNC using a Neural Network (NN). In this embodiment, user traffic is generated by a JavaScript library executed by the webpage in the client's browser 702. Connections 710 are made to a number of network sensors (not shown) running in geographically diverse network sensors (704). The network sensors 704 stream packet metadata to the VPN detection process running in server(s). In this embodiment, the VPN detection process is a Neural Network that has been trained to detect VPN traffic by processing metadata from a user session. A user session can be intentional in web page access, or can be opportunistic in the case of streaming media, and consist of many flows directed to a subset of the network sensors over the course of the user's access to the application or CDN servers.

Other machine learning techniques such as Recurrent Neural Network (RNN), Long-Short-Term Machine (LSTM), Random Forest, or eXtreme Gradient Boosting (XGBoost) decision tree can be applied. Multiple techniques can be used and can be federated. The VPN detection process yields a VPN classification decision 706 (e.g., VPN=yes/no), a confidence measure (e.g., 0-100%), potentially with additional geolocation information. The decision, confidence measure, ancillary determinations and optionally the metadata associated with the connection are stored in a database 708. This information may also be streamed to other processes such as a policy process used to block, challenge, sandbox, or allow the connection (not shown). The datastore 708 may be queried via an API, RESTful API, SQL, etc.

A single network sensor can provide the metadata required in order to classify a flow as having been transported over a VPN or proxy connection. Multiple network sensors may be used to improve the detection accuracy, and a majority vote or other weighting of individual sensors may be used. Decision trees or neural nets may also be used, acting on the collection of individual sensor metadata, or on fully pooled metadata.

Continuous Machine Learning Process

The distributed detection of proxied network connections system includes the VPN detection pipeline, methods, and apparatus for introducing training sessions into the pipeline and methods and apparatus for collecting and processing metadata that is then used to validate the Machine Learning process that detects the presence of VPN or proxy. Training and validation may occur continuously or on-demand and may be ongoing while the proxy detection system is in operation.

Figure 8:
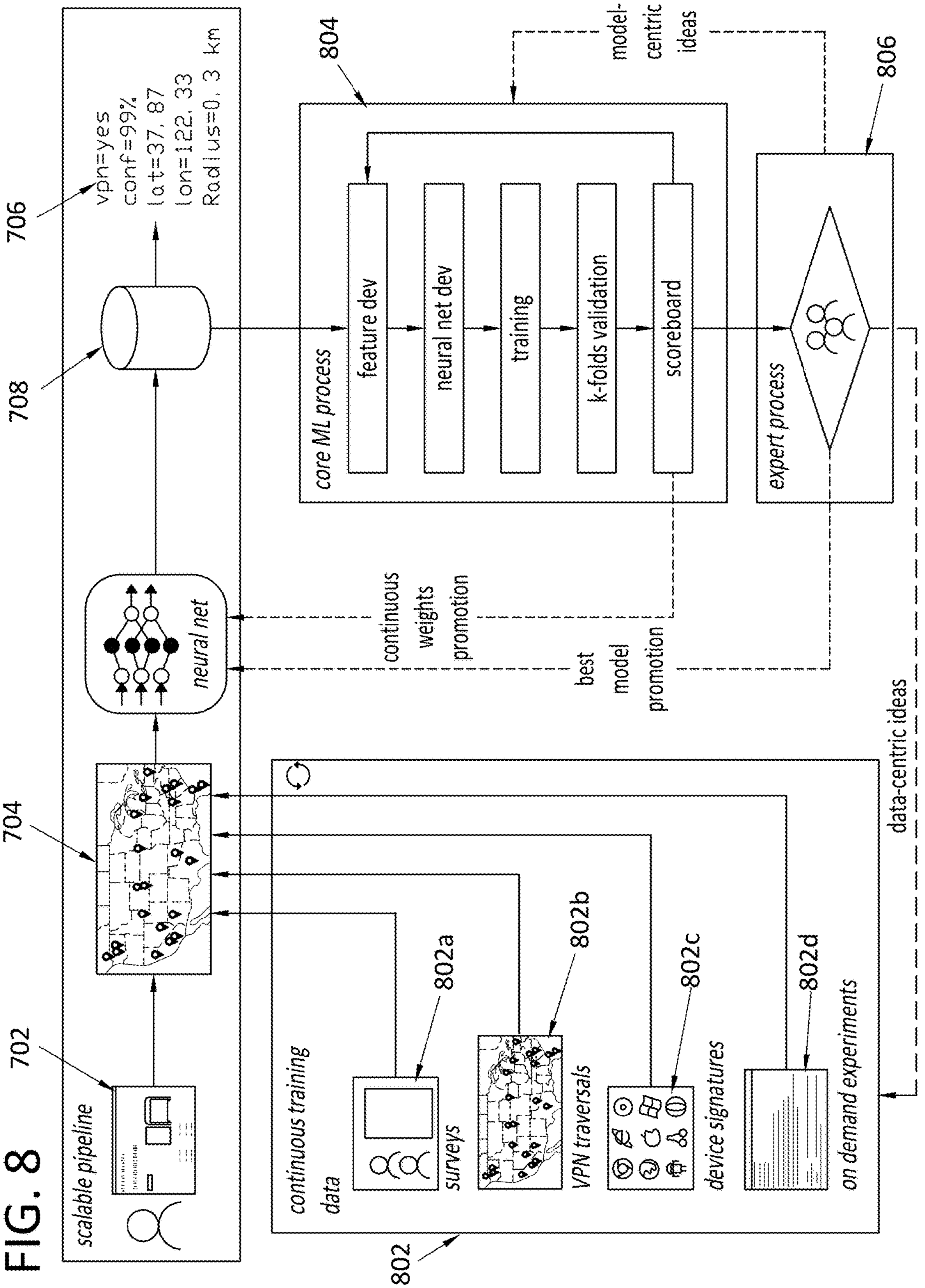
FIG. 8 is a process flow diagram illustrating DPNC according to embodiments of the present invention wherein using a neural network with continuous training and neural network model validation, weight, and model promotion.

FIG. 8 depicts one embodiment of continuously trained DPNC. The upper portion is the same as described in FIG. 7 and shows a user client 702 accessing an application through a webpage and the webpage uses the JavaScript Library to connect to the network sensors 704 that then create and stream the packet metadata to the neural network VPN detection process NN and database 708. The VPN detection, confidence, and potential other determinations of user or VPN server location are also streamed to the database 708. The database 708 can then be queried using a key such as the user's session id. The information can then be used by the querying processes for monitoring or policy decisions such as to block, challenge, sandbox, or allow the access. In practices there may be hundreds, thousands or even millions of online users accessing a particular application or streaming content. The DPNC system supports vertical and horizontal scalability. Vertical scalability through adding more network sensors in a given geography and across many geographies. Horizontal scalability through the use of larger, more powerful servers, virtual machines, or containers. The same scalability applies to the VPN detection process, where multiple trained Neural Networks can be instantiated in the same or different geography. Similarly for scalability of the database.

Training Sessions

Networks are not often static and unchanging. Network nodes (packet-forwarding devices such as routers and switches) are designed to operate in conditions where network links may fail or the routes and paths between and among the network nodes change for any reason including link failures, addition of network nodes and other changes. When these events occur, it is often the case the network selects or determines a new path from the source to the destination. These path changes may impact latency, jitter, throughput and loss between the source and destination and may also impact the makeup of the packet stream itself and impact the behavior of the transport protocol. Since the network changes with time, it is important that the distributed VPN detection system change to continue to provide accurate proxy detection.

The DPNC system can perform training and validation continuously and/or on-demand and may operate while the proxy detection system is in operation. Continuous and ongoing training on demand enables continuous weights promotion and best model promotion even the neural network is running. This is important since proxy methods and locations change over time, as does the underlying network configuration, capabilities, application software behavior, types, and application server geographic locations. Further the set of network sensors and their locations may vary over time.

The left side of FIG. 8 below the scalable pipeline shows several methods 802 to create training traffic, including user surveys 802*a*, VPN traversals 802*b*, device signature testing 802*c* and on-demand experiments 802*d*. Users may be enlisted to run webpage initiated tests that connect to the network sensors; these and other automated tests can be run over many different VPN providers with the intent to train the neural network to identify the many different VPN/proxy methods resulting in the ability to resolve not just that the access is direct, via proxy, and if by proxy, the type of proxy or specific proxy provider, e.g., NORDVPN, EXPRESSVPN, etc. User and automatically generated sessions may include access using different devices and operating systems resulting in the ability to resolve not just that the access is direct or via proxy, but that the access is over a specific device type or operating system type. Tests may be programmed to run continuously or on-demand.

When the training client sessions are performed, they may be identified with a session ID. The core machine learning 804 queries the database 708 for the data associated with known training session IDs and uses the metadata for these sessions in its training. In addition to providing the session metadata, decision and confidence level, the known training sessions are labelled by method (direct or proxy), device type, model or version, proxy type and provider, and optionally, include geographical location of the test client. The core ML process 804 extracts the features from the metadata, applies these to a neural network model structure that is in training, and with proxy detection (and other decisions such as device or proxy type) results are compared versus the known labels. The results are scored, fed back to train the neural network or ML process. The ML process under training may be the same structure as what is running live in the network, in which case if the newly trained weights perform better than the weights in the active proxy decision process, the new weights may be promoted (updated) to the active proxy decision process. This promotion can be done during a scheduled maintenance window or, if desired, continuously to the active proxy detection process.

The training process includes review by experts 806 who can choose to modify the ML models, structure (such as number of layers or elements), or new features or "tells" based on their insights and analysis of the scoreboard. These are model centric ideas. The new model(s) can be compared to the active model, and if deemed better are promoted to the active network replacing the old model.

The experts 806 may determine that new or additional packet processing methods or metadata features or statistics are warranted and devise new tests to be run. These are data centric ideas.

Figure 9:
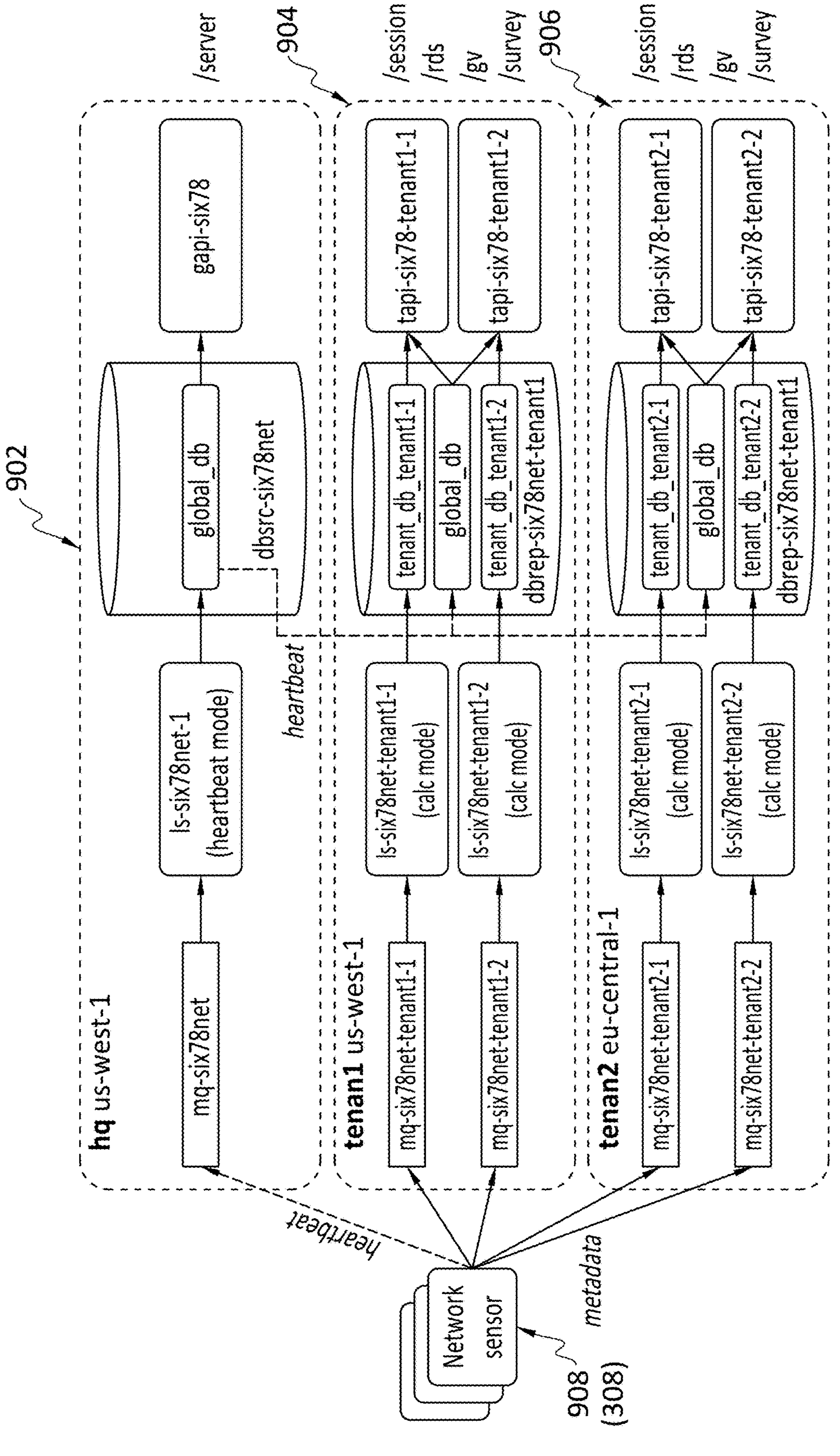
FIG. 9 is a flow diagram illustrating DPNC according to embodiments of the present invention with horizontal and vertical scaling, and real-time system status monitoring supporting multi-tenancy.

FIG. 9 depicts an embodiment of the invention that supports multitenancy and scalability. It may be desirable to operate a large set of network sensors 908 spread globally. The network sensors 908 may be vertically and horizontally scalable and can support up to millions of concurrent client accesses. Therefore, as opposed to replicating the network sensors 908 for each customer or application, it may be advantageous to support multitenancy where the network sensors 908 are shared, and where each tenant (904, 906) still has access to and control of their own proxy decision pipeline and database (shown within 902, 904, 906). The health of the overall network sensor deployment is monitored (top pipeline) 902. Below are the proxy detection pipelines of two tenants "tenant 1" 904 and "tenant 2" 906. While they share the same set of network sensors 908, tenant-specific session metadata is streamed to the correct tenant's proxy detection pipeline. The tenant pipelines run independently, scaled, or running their specific proxy detection process model. The pipelines are kept informed of the health of the global network sensor deployment by the health monitoring pipeline (top of FIG. 9).

Scalable Deployment

Scalability of the deployment is required to support the number of new accesses per second, geographical distribution, multiple applications, and the aforementioned multitenancy.

Network sensors in FIG. 9 may be instantiated by automated orchestration scripts, e.g., using existing software such as TERRAFORM, and configured via configuration scripts, such as, e.g., ANSIBLE. According to embodiments of the invention, network sensors 908 are typically physical servers, virtual private servers, or containers. The latter may be virtual instances from providers such as AMAZON, GOOGLE, and AZURE and are available with many variations of compute and network bandwidth scale. Multiple network sensors can be instantiated at a site, load-balanced or federated to act as a larger server. Network sensors 908 can stream metadata to a backend system over a number of message buses that may include AWS KINESIS, RABBITMQ, and ZMQ. Message bus streams may be associated with a single tenant, multiple tenants and can be directed at one or more proxy detection servers for processing. Proxy detection servers (shown in the two tenant pipelines in FIG. 9) can be physical servers, shared, virtual machines, containers, and located on-premises, or cloud-based. Metadata processing to form features to feed the neural network VPN detector processes (right most servers in each of the two tenant pipelines in FIG. 9) can be performed completely or allocated to the network sensor and location server. The system also preferably is configured to support load balancing by sharding by session id.

The metadata processing can form a stream with timestamped metadata features that can be processed in real-time or is stored as a file in database as shown. The session metadata is streamed or accessed from the database (in near real-time or forensically) to the VPN detection neural network that then computes the VPN detection confidence.

APIs

FIGS. 2 and 7-9 show API functions used by the application or monitoring system to query the results for sessions stored in the database. The DPNC system may support an API that provides VPN detection information and may also provide confidence measure, risk score, geolocation, and additional data for the monitored sessions, in addition to providing access to user session results and packet and session metadata. In the example embodiment, the API is accessed by the application using SQL or SQL-like queries to access a cloud-based Database where session information is stored. The query may include any of the desired unique session identifier, IP address, test label or wild-carded values in order to do batch lookups. In addition, the API queries may be for records for sessions occurring within a specified time window.

Figure 10:
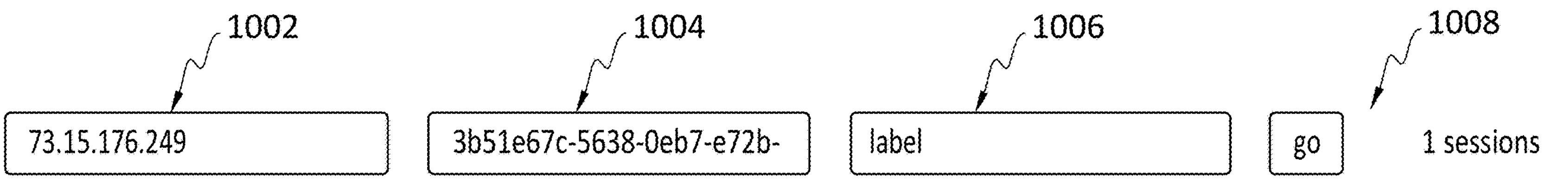
FIG. 10 is an image of a web-based GUI that formulates and reports results for API queries of the VPN Detection database using any combination of IP, Session ID, Label, potentially wildcarded or bounded in a time window according to embodiments of the present invention.

FIG. 10 depicts an embodiment of a Web-based user interface (UI), "Session Explorer", which uses an API to query the DPNC database. Query fields 1002-1006 may be provide. In this example, the DPNC database may be queried using any combination of IP address 1002, Session ID 1004, Label 1006, potentially wild-carded or bounded in a time window. A button 1008 can be provided to initiate the query and results 1010 may displayed below.

Figure 11:
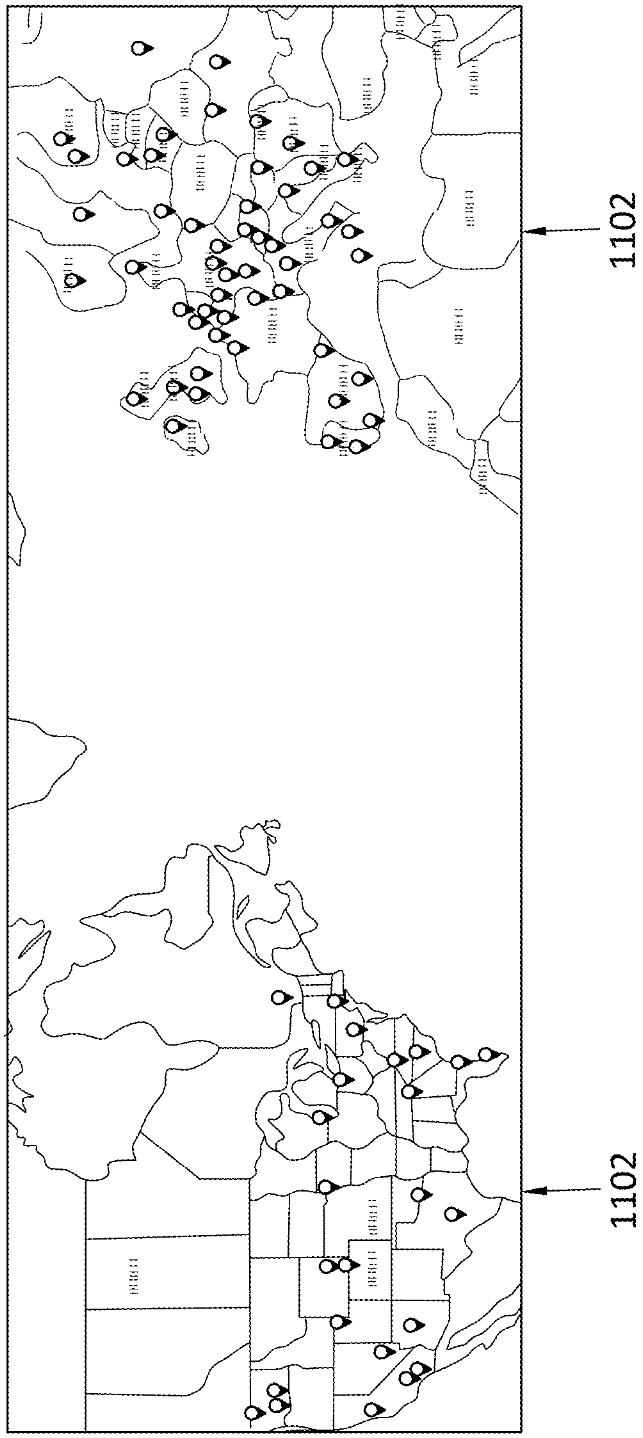
FIG. 11 is a map illustrating DPNC according to embodiments of the invention using geographically distributed network sensors.

FIG. 11 is a map view, showing the location of network sensors 1102. This view may be provided by an API and include health status for each network sensor 1102, for example, by showing healthy sensors in one color and unhealthy sensors in another color. According to embodiments, as illustrated here, the network sensors are geographically distributed.

DPNC may be performed using a single network sensor "sensor" in a single location or may include initiated connections to a set or subset of sensors distributed around the world. In one embodiment, many sensors 1102 are distributed around the earth, for instance many geographically distributed in the United States and Europe. Sensors may be deployed wherever there are network connected servers including Africa, South America Asia and so on. Sensors may be deployed on physical servers, virtual machines, or containers and with one or more sensors in a particular location for load balancing or redundancy.

Intentional and Opportunistic Packet Processing

According to embodiments of the invention, the DPNC is configured to observe packet streams between the client accessing the application and the network sensors. In one embodiment, the client device is caused to generate streams to/from network sensors. These streams are intentional. In one specific embodiment, the intentional streams are TLS/TCP/IP.

In other embodiments, the streams may be TLS/SCTP/IP. Streams may be IP4, IPV6. Intentional streams can be generated by the client and the client may generate one or multiple streams to one network sensor, one or multiple streams to each of multiple sensors. In one embodiment, the network sensor is implemented in the Linux kernel. In other embodiments, the sensor can be a process running on a physical machine, virtual machine, or container on any operating system, e.g., android, iOS, MacOS, Windows.

In another embodiment, DPNC observes packets that are normally generated by the application. These are opportunistic streams. In these cases, the streams may be the same types as intentional streams, e.g., TLS/TCP/IP. Opportunistic streams can be generated by the client and the client may generate one or multiple streams to one network sensor, one or multiple streams to each of multiple sensors.

In another embodiment, the invention uses both intentional and opportunistic streams.

In another embodiment, opportunistic packets are passively observed by a network sensor that is co-located at or very near to the server side of the connection.

In various embodiments, the observed packets can be copied and to the network sensor using a passive tap (optical or electrical), actively port mirrored or spanned to the sensor, or from a network monitor device. The network sensor may provide the timestamping of the packet arrival time, or it may use timestamps that are appended to the externally observed packet data.

In these and other embodiments, the observed packets, or packet slices, are initially stored in memory, a file, on a disk or non-volatile storage, along with the observation times. These packets, files, storage can be processed in no-real time by the sensor, and its metadata.

Intentional User Traffic Embodiments

Figure 12:
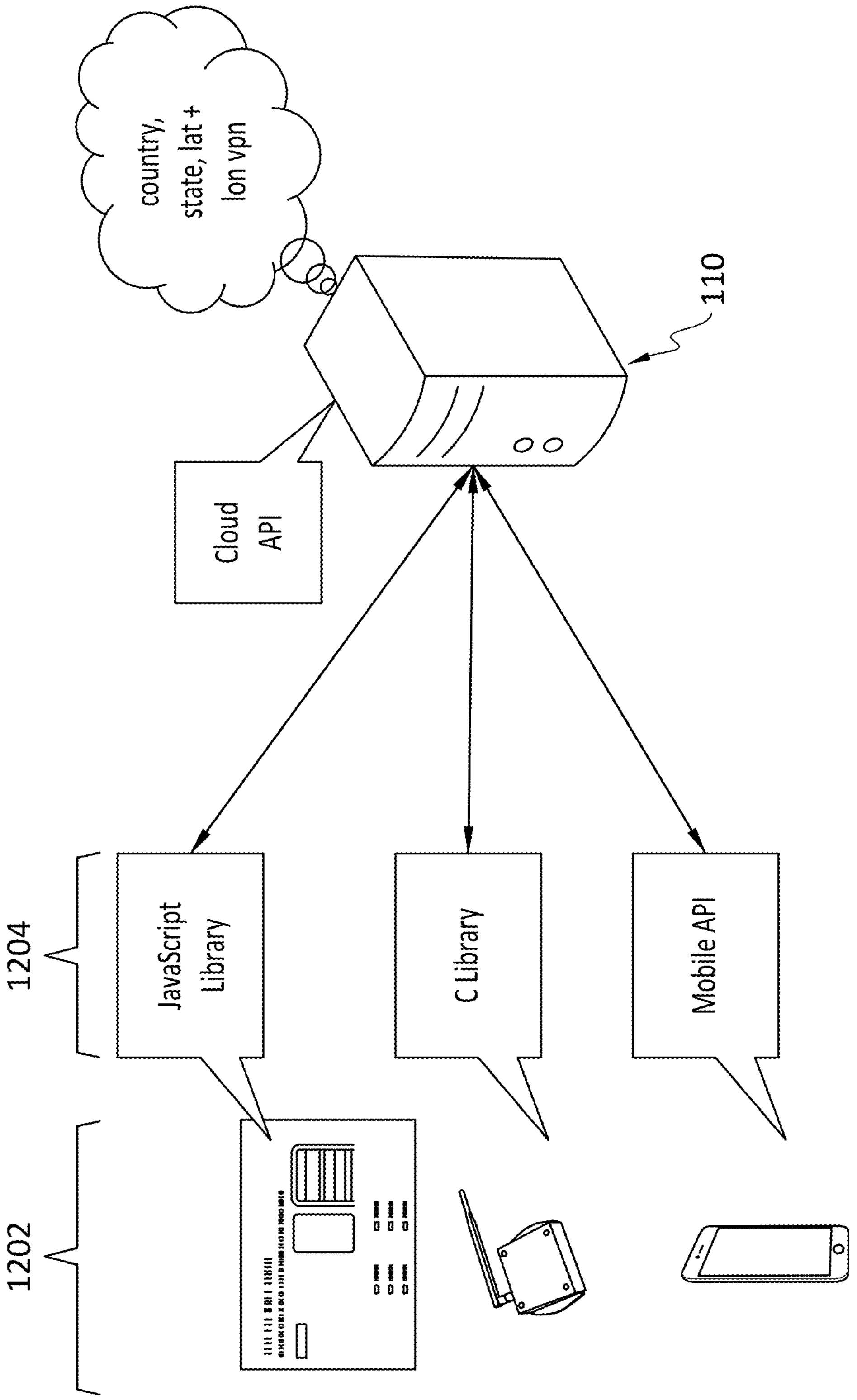
FIG. 12 is a block diagram illustrating DPNC according to embodiments of the invention showing a variety of network traffic sources including JavaScript library, embedded C in an IoT device or API on a Mobile device, e.g., Android phone.

FIG. 12 is a high-level diagram illustrating various traffic source embodiments. Network traffic can be initiated by the device 1202 in a number of traffic sources 1204, shown with two way traffic with a server 110, which may be an application server or web server and may include a cloud API. Traffic can be initiated as a (1) JavaScript library invoked by a browser (e.g., Chrome, Safari, Firefox, Brave, Explorer, et al) running on a computing device 1202 (e.g., laptop, desktop, personal digital assistant, mobile phone). The traffic source may also be implemented in any programming language, compiled or scripted and executed may be (2) embedded firmware running on a network device such as a router, switch, server, Internet of Things (IoT). The traffic source generator may also be ported to any operating system, including (3) mobile operating systems (e.g., Android, iOS, Linux, windows, etc.) and run as a kernel or user level process.

The traffic generation process may be initiated upon initial request of the webpage, and can also be run continuously, periodically, as scheduled, on demand (via a user keyclick or button press) or when the page is refreshed. Similarly, the traffic generation process may be initiated be run continuously, periodically, as scheduled, on demand (via a user keyclick or button press) by applications running on the embedded or mobile device 1202 without a webpage.

Opportunistic User Traffic Embodiments

Figure 13:
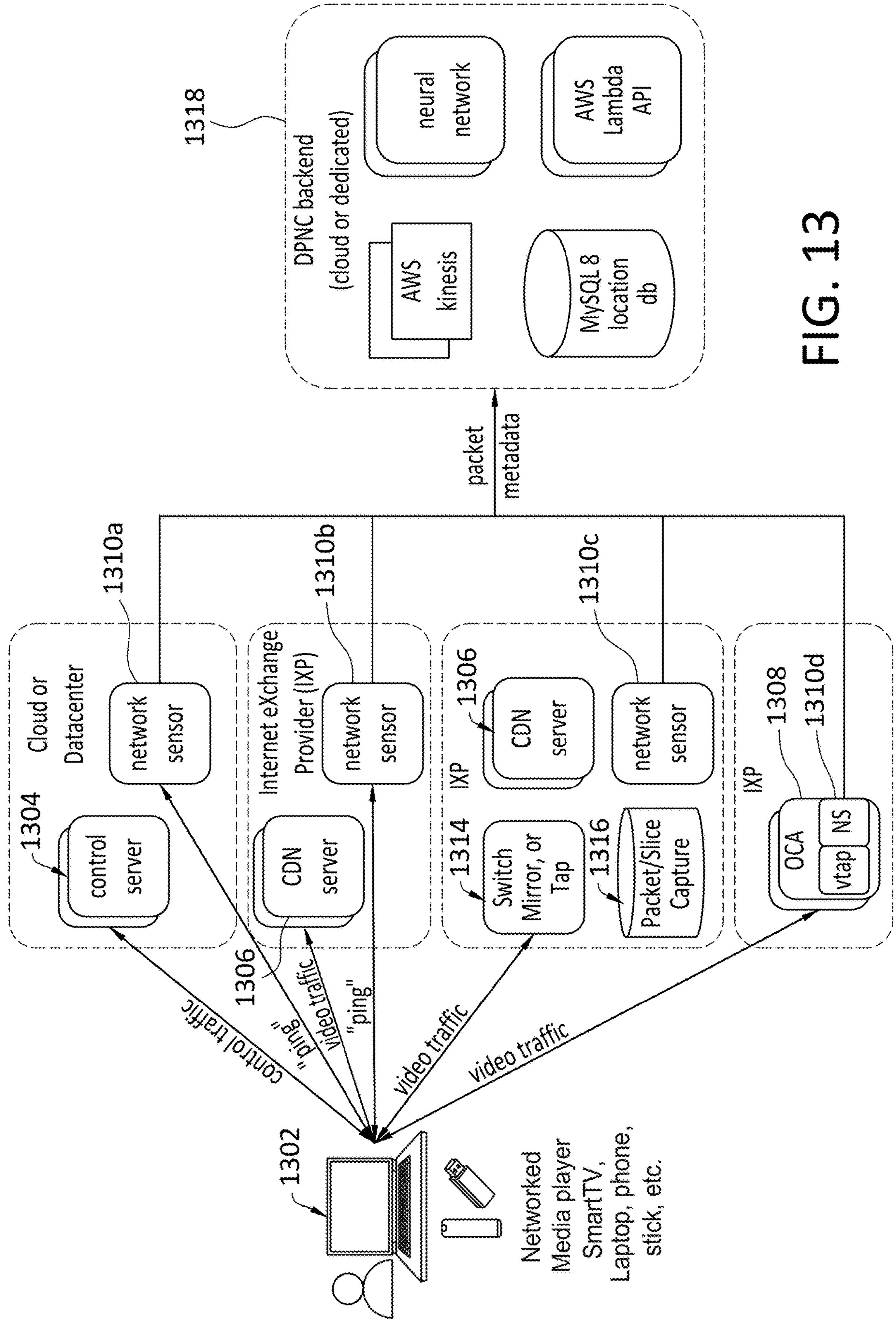
FIG. 13 is a diagram illustrating DPNC according to embodiments of the invention using existing traffic analyzed in real-time or from stored packet or stored packet payloads.

FIG. 13 is a flow diagram illustrating an embodiment of DPNC which can detect a tunnel/VPN using either intentional or opportunistic network traffic or both intentional and opportunistic network traffic. In this embodiment a user device 1302 may make connections to various servers 1304, 1306, 1308 or network sensors 1310_a-d_ over the course of a session, all of which may be tested by the DPNC. For example, in the case of a user accessing a streaming media service, the user may first connect to a "control server" 1304 to authenticate and retrieve an index of available streaming content. Subsequently, the authenticated user may connect to multiple different "content servers" 1306 1308 to stream media files specified in the index. DPNC may be invoked at multiple times during the lifetime of a session to detect if a tunnel/VPN has been used or introduced between the user and content servers. All connections between users and servers or network sensors in this embodiment are made using HTTPS (HTTP over TLS) over a TCP/IP network.

The user's system 1302 (e.g., a web browser, tablet or phone app, computer application, set top video box, smart TV application, streaming media "stick") provides login credentials to a "control server" 1304 to initiate a session and retrieve the locations of available streaming media. The client also makes an intentional connection to a network sensor 1310_a_ in order that the DPNC system can determine if a tunnel/VPN is in use Streaming content may be cached by a Content Distribution Network (CDN) (e.g., AKAMAI, CLOUDFLARE, AWS CLOUDFRONT) to reduce latency and improve user experience. The authenticated user 1302 makes a connection to a CDN content server 1304, 1306 specified in the index in addition to an intentional connection to a network sensor 1310_b_ in order that the DPNC can determine if a tunnel/VPN is in use. During the lifetime of the session the client may make multiple connections to both CDN content servers and network sensors ensuring that tunnel/VPN status is not changed.

Instead of requiring a separate intentional connection to a network sensor, the DPNC system may opportunistically use the connection between user 1302 and content server 1306 itself to determine of a tunnel/VPN is in use. A mechanism such as a port mirror, SPAN port or tap 1314 is used to duplicate the network traffic between user and content server and forwards this traffic directly to a network sensor 1310_c_ or potentially with or after storing in a packet capture device 1316. The DPNC server 1318 processes this duplicated traffic to determine of a tunnel/VPN is in use. In this case the traffic duplication and DPNC detection process is transparent to both the user and content server.

The content server may itself be able use existing opportunistic traffic for DPNC server 1318. DPNC software installed on the content server itself observes network traffic between user and itself by monitoring the OS network stack directly and providing duplicated packets to a network sensor 1310_d_ running on the content server itself. In this case the DPNC detection process is transparent to both the user and content server.

DPNC Machine Learning Process

Figure 14:
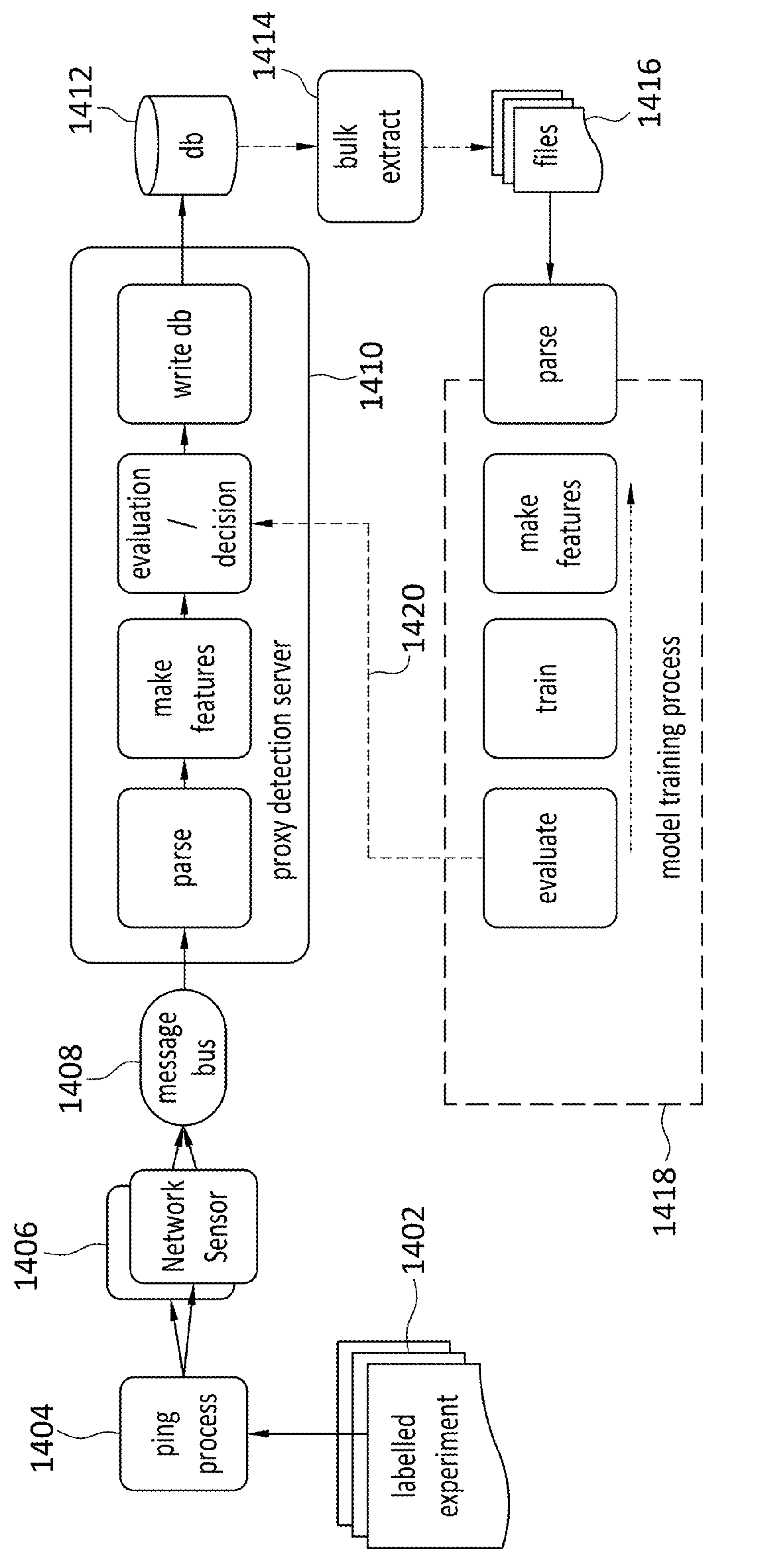
FIG. 14 is a flow diagram illustrating metadata extracted from the packets of a network connection between a client and an endpoint as observed at the endpoint, in this example, a network sensor, according to embodiments of the invention.

FIG. 14 is a flow chart that illustrates an embodiment of a DPNC machine learning process. Labeled experiments 1402 may be scheduled or run continuously to create connections 1404 (e.g., ping) to the network sensors 1406, where packets are processed into slices or metadata streamed via a message bus 1408 to a proxy detection server 1410. At the proxy detection server 1410, the packet metadata is parsed (1410(*a*)), features extracted (1410(*b*)), evaluated (1410(*c*)), and results written (1410(*d*)) into a database 1412. The session data can be queried and processed in bulk (1414), stored in files 1416 local to the training process 1418, parsed (1418(*a*)), and features (tells) extracted (1418 (*b*)). Neural network, decision tree or federated machine learning architecture are trained (1418(*c*)) based on the labels for the particular session. The success of the proxy decision (or other decisions per the experiment labels) are evaluated (1418(*d*)), and if the performance of the newly trained model is better than then actively running process, the active model can have its weights updated (1420), or if necessary, its model replaced.

Metadata Aggregations

FIG. 15 is a table 1502 illustrating exemplary metadata extracted from the packets of a network connection between a client and an endpoint as observed at the endpoint, in this example, a network sensor. As shown in this example, each row 1506 may be generated by a packet of the connection. As shown in this example, the columns are features gleaned from the packet including Layer 3 IP fields (address, port) 1504*a-b*, Layer 4 fields including TCP flags 1504*d-e*, and Higher layer, e.g., Application Layer fields, including TLS tokens 1504*f*, the timestamp of the packet's observation and its direction 1504*c* with respect to the observer (ingress, egress). These are just some of the features that can be extracted during the metadata generation process according to embodiments of the invention.

Once these features are available per packet, the DPNC can compute additional features according to the unfolding of the states of a TCP flow from the network layer to the application layer, further compute features over up to all of the flows of a client-sensor connection including inter-flow latency, and further compute features over up to all of the network sensors of a session.

Further aspects of the invention according to embodiments can be described by way of example. A client navigates to a webpage using a browser. The remote webserver serves the webpage in which a JavaScript library is embedded. The library is called initiating the VPN Detection and Geolocation session. A session consists of an HTTPS "GET" request directed at a number of remote endpoints, e.g., network sensors. The HTTPS "GET", or "ping," is a resource request for an image file from a webserver running on the network sensors. The "ping" begins with the establishment of a TCP connection, a TLS connection handshake, and ultimately the data transfer request and response followed by termination of the TCP connection. This process can be automatically repeated a desired number of times by use of a HTTPS redirect until the image is ultimately supplied, or the redirect limit is achieved. Further, the client may repeat the ping process several times with its chosen set of network sensors. Thus, from the lowest to the highest construct, there are:

i. Individual packet
ii. TCP handshakes
iii. SSL/TLS handshake
iv. TCP flow—all of the packets for a TCP connection
v. Ping/HTTP GET consisting of many TCP flows due to HTTPS redirection
vi. Ping Set (repeated pings between the client and a network sensor)
vii. Session—the totality of all the ping sets between the client and the set of network sensors Features may be extracted relating to each of these and computed over all of the above groupings, including inter-flow and inter ping latencies, and for various temporal and statistical relationships among the sets.

Neural Network Example Embodiment

One example Neural Network embodiment includes a 4-layer perceptron neural network with an input layer (18 nodes), 2 hidden layers (both 1200 nodes), and one output layer (single node), totaling 2419 nodes. The activation function for the hidden layers may be Rectified Linear Unit (ReLU). Hidden layers can use dropout and batch-normalization, a technique that improves the performance and stability of deep neural networks by standardizing the outputs of each layer. The activation function for the output layer may be sigmoid as it is a classifier that returns a score between 0.0 and 1.0, in this case, for instance, where 0.0 meaning not a VPN and 1.0 meaning 100% sure of VPN. Each time-duration input feature may be normalized independently, across the session, using the z-transform/z-score, i.e., for feature t, $z=(t-\text{mean}(t))/\sigma(t)$. The z-score brings related session inputs together in a more uniform, normalized range of values space that is consistent for all network sensors in the session.

The neural network can independently evaluate the metadata from one or more network sensors to generate a per network sensor score in the range 0 to 1. A final score in the range 0 to 1 is determined by averaging the individual scores from the set of participating range sensors. This value is deemed the confidence score, or conversely a risk score. The application can access scores from the database through a cloud-based API. The VPN confidence measure for a session may be input to a policy engine that uses the measure to inform a policy that may allow/challenge/block access and may provide full or limited access or direct accesses to a "sandbox" when deemed concerning. For example, one possibility is that 0-0.5 is allowed, >0.5 to 0.8 is challenged and >0.8 is blocked. In other embodiments, scores do not have to be constrained or scaled to 0 to 1, and the final combination of scores may involve other machine learning techniques, e.g., majority vote, weighted voting, decision trees, and neural network.

According to some embodiments, Binary Cross Entropy (BCE) drive the machine learning back propagation. BCE is essentially a log of the abs difference between each label and the corresponding prediction, averaged across each training batch. See e.g., https://pytorch.org/docs/stable/generated/torch.nn.BCELoss.html.

At a low level, each training process cycle can entail the following steps:

i. Take a randomized selection from the training set (a batch)
ii. Forward-prop and compute loss
iii. Back-prop to update weights At a higher level (ignoring K-folds validation), the process can include the following steps:

i. Train N batches until each sample in training set has been used once
ii. Using current neural network, compute loss across all samples in validation set
iii. Repeat steps 1 and 2 until validation loss stops decreasing or starts to rise
iv. Pick one of the sets of weights with minimal validation loss as "the model"
v. Compute accuracy by running all samples in the test set Tuning can include the following steps:

i. Pick a "hyper-parameter" (i.e., one that can't be optimized through back-propagation, e.g., the learning-rate, or number of nodes in a hidden layer)

ii. Vary that parameter, run through training each time, record test score iii. Compare parameter with test score. Determine if there is there a relationship and if hyper-parameter improves neural network performance.

iv. Repeat until convergence or iteration limit reached.

The training features, or tells, can include metadata selected from the session packets and statistics of durations of TCP and TLS state machines: Select metadata may include but is not limited to: Packet Header options: TCP Options, Window, State transition duration statistics (minimum, mean, maximum and standard deviation): TCP Three-Way Handshake, TLS "ServerHello To Cipher", TLS "Cipher To ClientData", TLS "ServerData To Ack". Statistics are preferably aggregated over user sessions for a given network sensor, per network sensor, and all network sensors.

These and other tells can be input to the Machine Learning system during training; and by the operational system to classify and score real-time accesses.

Example Encapsulation of IP Packet in IPSec AH

FIG. 16 illustrates the impact of a tunnel on the behavior of the traffic—the tunnel changes the packet size and packet path and thus the latency and jitter of the traffic is altered from a non-tunneled connection. Such impacts are described at http://www.unixwiz.net/techtips/iguide-ipsec.html, and https://docs.vmware.com/en/VMware-SD-WAN/4.5/VMware-SD-WAN-Administration-Guide/GUID-72AA55E3-C0F4-4E0A-BFBC-E4077E0F4D6E.html.

FIG. 16 shows a common proxy scenario showing one method to tunnel an IP packet using IPSec in Authentication Header (AH) tunnel mode. In this case, the original IP packet 1602 is encrypted, and its IP addresses are not visible while inside the tunnel. As clearly shown, the IPSEC AH packet 1604 is larger than the original packet and has different IP addresses with the destination IP address that of the location where the tunnel is terminated. The combination of larger packet size and different forwarding path can alter the latency and jitter, and other fields such as Time to Live (TTL) of the connection. Accordingly, in embodiments of the invention, the proxy detection process is trained to distinguish from traffic that did not go through a tunnel.

FIG. 17 illustrates the IP fragmentation process where a large datagram 1702 (i.e., larger than the maximum transmission unit (MTU) of the tunnel), is split into two (or more) smaller datagrams 1704 so as not to exceed a tunnel's MTU. Although the tunneled packet is reassembled at the far end of the tunnel, the fragmentation process impacts the latency, jitter, and Time to Live (TTL) of the connection altered. Accordingly, in embodiments of the invention, the proxy detection process can be trained to distinguish tunneled traffic from non-tunneled traffic. Further, the more the packets and the larger the packets, the more likely for packets to be lost. This results in higher packet error rates, and potentially retransmissions with very long latency that also impact the transport protocol processes (e.g., TCP), in ways that the proxy detection process is trained to distinguish tunneled traffic from non-tunneled traffic.

Figure 18:
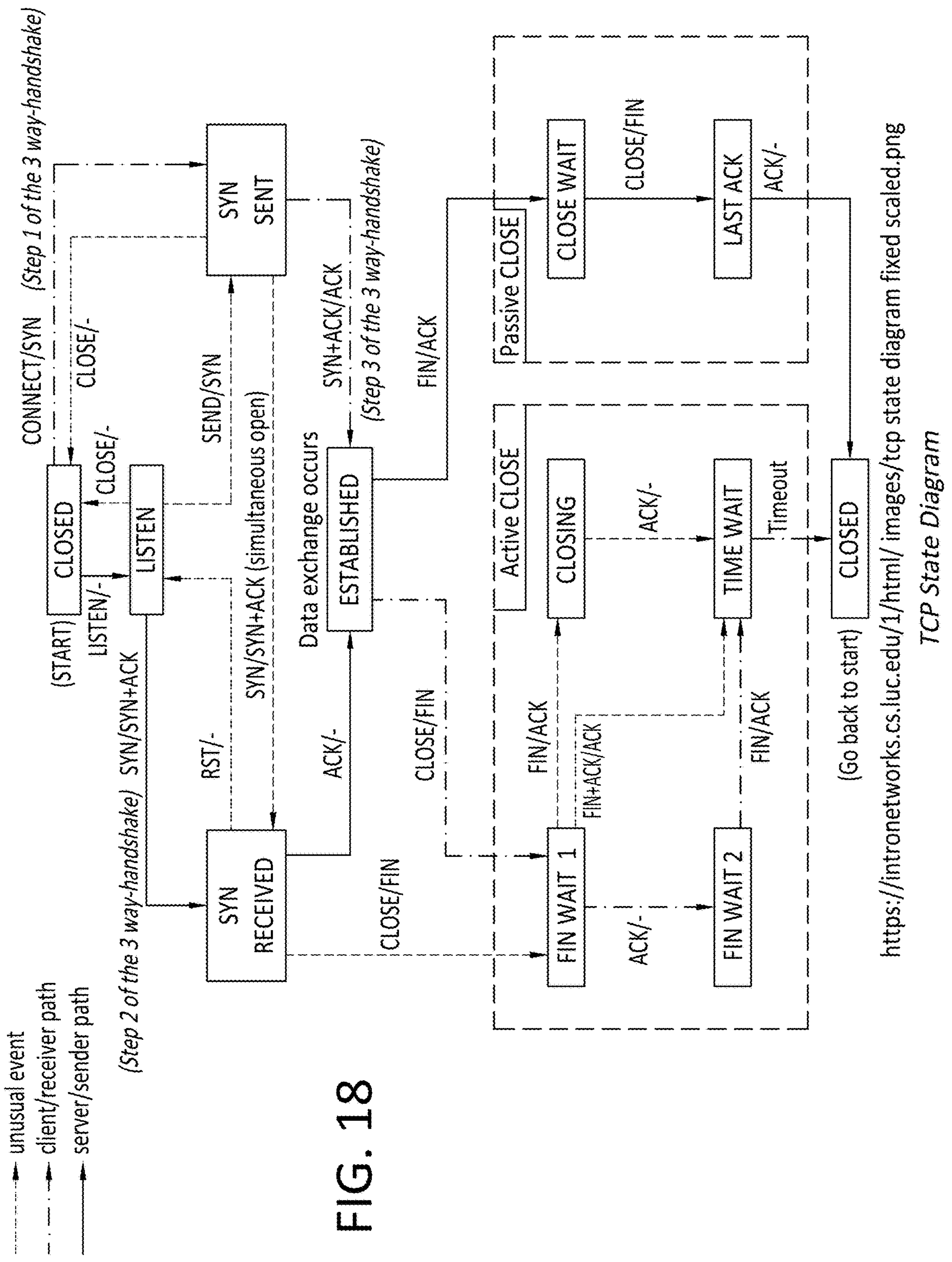
FIG. 18 is the standard TCP state diagram to establish and close a connection.

FIG. 18 is the standard Transmission Control Protocol (TCP) state diagram to establish and close a connection. The TCP protocol is often used to establish a connection between two IP networked systems. The skilled person will readily understand, as shown in the state diagram, the TCP uses a state machine to open, operate and then close a connection and includes the ability to control the rate of traffic over the connection in a way to allow multiple network connections to share network bandwidth. The latency, jitter and handling of packet loss imposes certain latency and jitter behavior of the connection. Further, when a connection is tunneled that uses TCP, there is an interaction of the transport protocol of the tunneled traffic (the client to application traffic may also use its own TCP) with the TCP of the tunnel. The tunnel's TCP impacts the behavior of the client traffic. Accordingly, in embodiments of the invention, the proxy detection process is trained to distinguish tunneled traffic from non-tunneled traffic.

Figure 19:
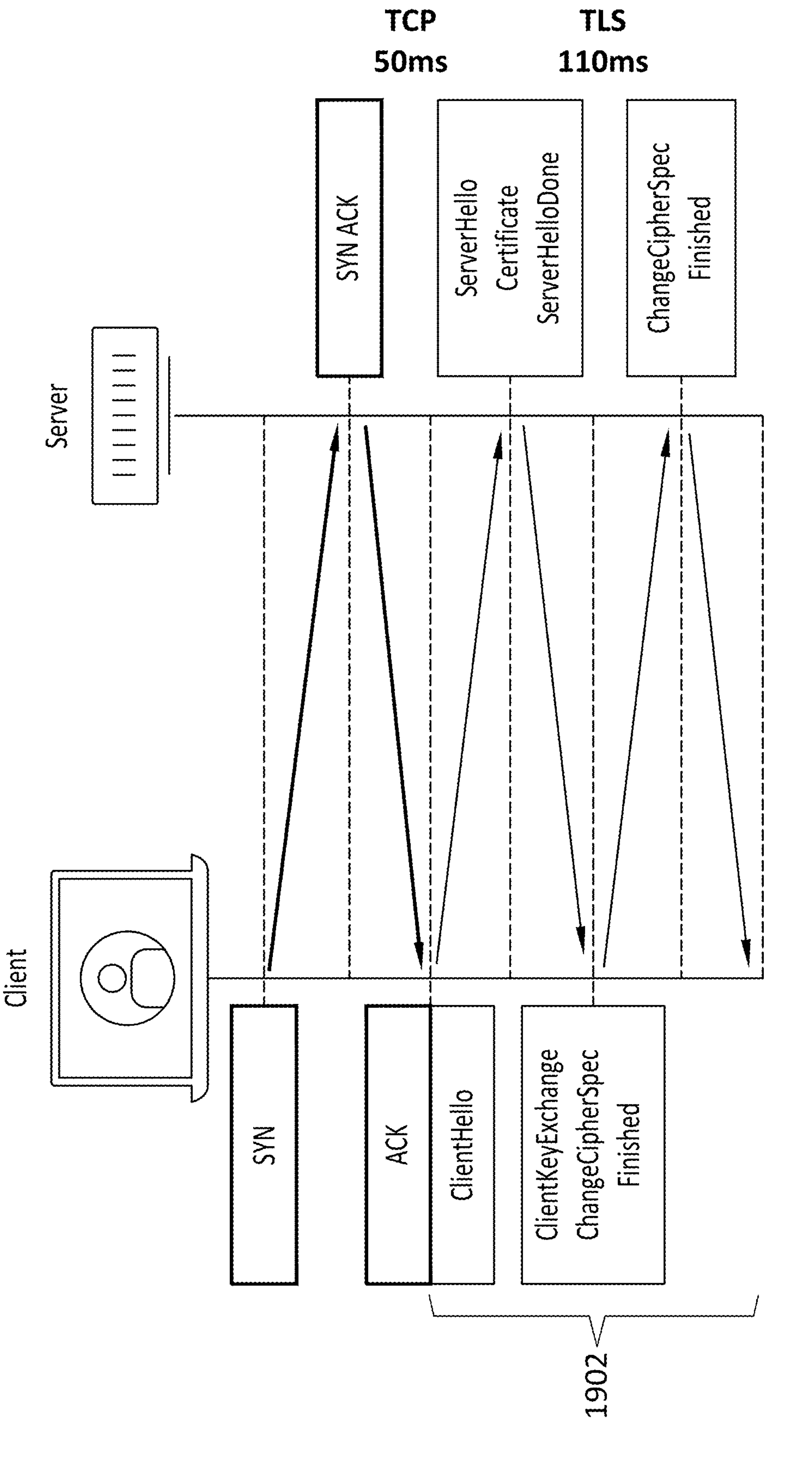
FIG. 19 is a flow diagram of the TLS transaction.

FIG. 19 is the Transport Layer Security (TLS) handshake state machine. TLS provides communication security at the applications layer. The skilled person will readily understand key aspects of the TLS handshake 1902 including certificates are exchanged that provide means for applications and clients to be assured of the privacy, confidentiality integrity and authenticity of the connection. This protocol is used by most modern networked applications, notably by the ubiquitous HTTPS. This transaction is at the application layer between the client and application server. When tunneled, the TLS packets are often fragmented due to the tunnel MTU, latency and jitter statistics altered, and packet loss rates altered, with an impact to the timing of the TLS state machine. The tunnel's impacts the behavior of the client's TLS traffic. Accordingly, in embodiments of the invention, the proxy detection process is trained to distinguish tunneled traffic from non-tunneled traffic.

FIG. 20(*a*)-(*b*) illustrate the various fields of an Internet Protocol (IP) packet, notably a 20B header, options, and data. IP operates at the Network layer (layer 3) of the Open Systems Interconnect (OSI) model. The data portion of the IP packet can be used by transport layer protocols at Layer 4 of the OSI model that in turn contain the application layer data. There are several types of Layer 3 transport protocols, notable Transmission Control Protocol (TCP), User Datagram Protocol (UDP) and Stream Control Transmission Protocol (SCTP). The skilled person will understand that each of these protocols has its own set of fields and potentially a well-defined state machine for initiating, maintaining, and closing connections.

FIG. 20(*c*) is a diagram of the fields of a TCP protocol data unit (PDU). It shows the fields used in the process for establishing a connection, maintaining it, and then closing the connection. During the connection establishment, the 3-way Handshake is used to establish the connection and to set parameters for the connection. Among these option parameters are the port numbers, maximum segment size (MSS), TCP window size, etc.

The present invention can be applied to not only IP protocols, e.g., IP version 4 (IPv4) or IP version 6 IPv6, and TCP, but other transport protocols that can operate over IP, such as User Datagram Protocol (UDP) and Stream Control Transmission Protocol (SCTP).

Several of the IP and TCP fields, options and parameters are constrained by the underlying network or, in the case of a proxy, the tunnel. For example, the maximum transmission unit (MTU) size on the network path between two Internet Protocol (IP) hosts is limited by the maximum size packet on the layer two network (e.g., Ethernet) or by the IPSEC Tunnel that is itself limited by the layer two network. Protocols such as Path MTU Discovery (PMTUD) is a standardized technique in computer networking to determine the MTU. See https://en.wikipedia.org/wiki/

Path_MTU_Discovery, incorporated herein by reference. Since the Layer 2 network limits the MTU, the tunnel is limited and this results in a different (generally smaller) MTU for the clients IP packets that are tunneled. This also has an impact on the TCP Maximum Segment Size (MSS) wherein the MSS over the tunnel is less than that of a non-tunneled TCP connection.

At the IP layer, one of the most obvious differences is in the IP Time-to-Live (TTL). The IP TTL is initially set to a certain number (e.g., 64 or 128) and decremented by each router that forwards the packet to its ultimate endpoint. A VPN Tunnel shelters the host's TTL from being decremented until it egresses the VPN endpoint. In the case of a long, potentially international, route through a tunnel, the IP TTL is essentially unchanged until the packet egresses the remote VPN server. This makes it appear as though the connection originated at the VPN server, and if the server is physically located in the destination country, it will appear to be in that country by virtue of the non-decremented IP TTL. In other words, a non-tunneled packet originating in San Jose, CA, may see its TTL decremented from 64 to 44 along a journey of 20 routers to an endpoint in London, UK. On the other hand, a VPN tunnel from San Jose to London, UK will leave the VPN server with an IP TTL of 64 and perhaps reach the destination endpoint with an IP TTL of 60 since there are fewer router hops from the London VPN server to the London endpoint. This, combined with the fact that it is impossible for a packet to travel faster than the speed of light and a client in San Jose may not be able to send a packet in any time less than the physical delay through the physical network, switches and routers. This physically constrained delay limitation (for one-way and roundtrip communications) may be different (larger than) that which would be expected for a system that was actually located in London talking to an endpoint in London.

In addition to these gross packet and temporal differences, there a number of other subtle differences that can be detected to classify a VPN connection from a direct connection. These include packet loss and retransmission rate variations, relative delays observed among sets of network sensors.

In addition, there are features (tells) that may be used to train a neural network or other machine learning systems (Random Forest decision tree, XGBoost, or heuristic) to classify a session as being conducted over VPN/proxy. The features can be associated with ("extracted") from the metadata processed form the packets of the stream. The features can be from fields in a particular packet, a pair of packets, the states of the protocols such as TCP and SSL/TLS connections, the full set of packets of a TCP flow, the full set of flows of the client to a particular network sensor, functional comparisons and measures taken over all the network sensor sensors. The features can be individual fields of the packets, per packet type, per state, flow, connection, session, and the temporal relationship of the packets with respect to one another such as the TCP Round Trip Time (RTT). Features can be alphanumeric values, flags, bits, states. Counts of packets, by packet type, state, and flag settings. Further, features can be derived from histograms, minimum values, mean, median, maximum, variance. Features may include mathematical comparisons (less than, equal too, between), mathematical ratios, and measures on set and subset membership.

The VPN/proxy tunnel impacts the behavior of the client's IP and TCP fields. Accordingly, in embodiments of the invention, the proxy detection process is trained to distinguish tunneled traffic from non-tunneled traffic.

FIG. 21 illustrates two important impacts in the case of a proxy using IPsec with Encapsulation Security Protocol (ESP) in tunnel mode. https://en.wikipedia.org/wiki/IPsec. On the left is shown an untunneled packet 2102. On the right is shown a tunneled packet 2104 encompassing the untunneled packet 2102. As shown in the diagram, this tunnel mode adds fields 2104*a, b* to the beginning and end of the untunneled packet. These fields 2104*a, b* can easily add up to 100 or more bytes on top of the original message. If the original message is small, as per a 64 B IP packet, the resulting IPsec packet may be more than double that in size. In the case of larger IP payloads, or a stream of larger IP payloads as would be typical in a file transfer or video stream, the IP packet is limited in size due to the layer two protocol. In the case of a standard Ethernet link, the Maximum Transmission Unit is 1500 B. See e.g., https://en.wikipedia.org/wiki/Maximum_transmission_unit. An untunneled IP packet could be as large as the MTU. In the case of typical IPv4 packets, the IP header is typically 20 B, leaving up to 1480 B for payload. However, when a proxy IPsec ESP tunnel is present, the tunnel limited path MTU may be reduced to 1400 B or less. The IPsec ESP tunnel therefore impacts connections through the tunnels in a number of ways:

i. more packets required for a given amount of data to transport,
ii. greater required throughput in the tunnel,
iii. larger latency,
iv. larger latency variation (jitter),
v. larger packet loss (due to more bits and packets than for untunneled packets).

Though the DPNC network sensors do not directly process packets that are in the tunnel, the above impacts are detectable on the server side of the connection. Accordingly, embodiments of the invention are configured and/or trained to consider this information for the detection of a proxied connection.

FIG. 22 illustrates the impact of the tunnel limited MTU on the Maximum Segment Size (MSS) for Transmission Control Protocol (TCP). See also http://www.highteck.net/EN/Transport/OSI_Transport_Layer.html which is incorporated herein by reference.

TCP is a connection-oriented protocol for the reliable transfer of information over a network. In many cases, the information to be transported may be files or video streams. These files may be large or long-lived video streams and exceed the Maximum Segment Size (MSS) imposed on the connection due to IP transport over the network. Though IPv4 can support an MSS of 64 KB, the network typically imposes a much smaller MSS due to the MTU imposed by the network link. In an untunneled situation, the MTU is often 1500 B. In combination of a 20 B IPv4 header, and a 20 B TCP header, the MSS is often limited to 1460 B (MSS(clear) versus MSS(tunnel)). In the case of a VPN tunnel, however, the tunnel overhead may easily exceed 100 B resulting in an MSS of 1360 B or fewer.

As shown in FIG. 22, this results in a larger number of packets and greater throughput required in the tunnel to transport the same amount of client data. Again, this results in greater latency, jitter and loss than for untunneled connections. Additionally, the TCP connection that is transported through the tunnel is impacted by the larger number of packets, latency and loss in ways that are detectable outside the tunnel on the server side. Note that the proxy tunnel may use TCP, UDP, SCTP or other network transport layer protocols to exchange packets between the client and server and these operate at the outer layer of the connection.

The outer layers of the proxy tunnel are processed and added/removed by the by the proxy server and are not visible on the target server side of the connection. However, as previously discussed, the impact of the tunnel (latency, jitter, loss, and other packet modifications) is detectable on the target server side and used by DPNC to detect the presence of the proxy tunnel.

The VPN/proxy tunnel impacts the behavior of the client's connection resulting in different packets counts and packet sizes (and loss, latency, and jitter). Accordingly, in embodiments of the invention, the proxy detection process is trained to distinguish tunneled traffic from non-tunneled traffic.

Figure 23:
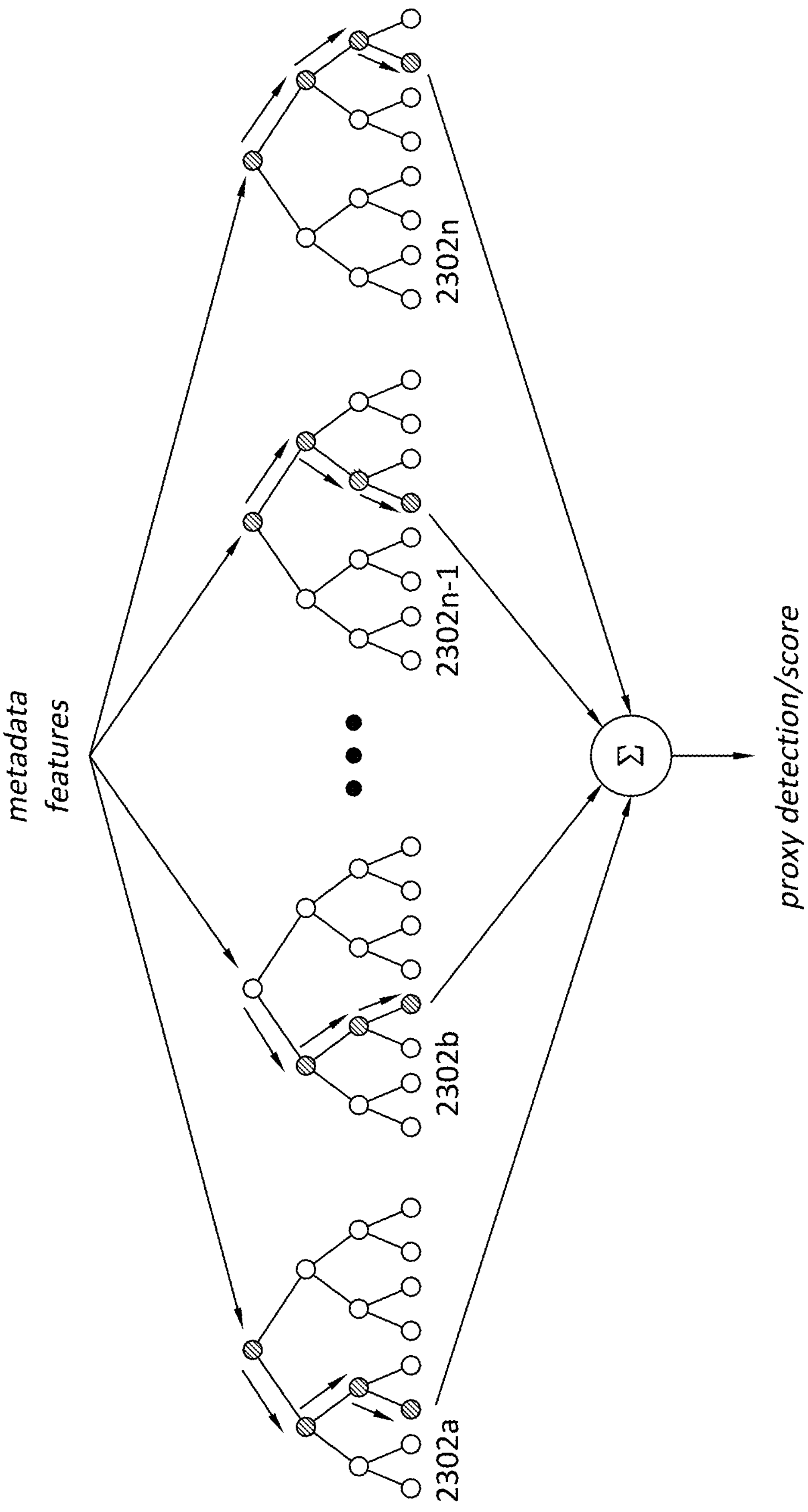
FIG. 23 is a diagram illustrating trained decision tree(s) returning a result.

FIG. 23 is a diagram illustrating a classifier that combines multiple individual decision trees 2302*a*-2302*n*. See also https://www.researchgate.net/figure/Classifier-that-combines-many-single-decision-trees_fig2_340984420; https://www.theclickreader.com/decision-tree-classifier/; https://towardsdatascience.com/an-exhaustive-guide-to-classification-using-decision-trees-8d472e77223f.

VPN classifiers 2302(*a-n*) may be a trained neural network, a software heuristic, a simple or compound decision tree (e.g., Random Forest and/or XGBoost variants), or an ensemble of classifiers of similar or dissimilar type may provide output classification, confidence, and optional other information such as geolocation. The output y also may be computed by a function such as majority vote, weighted or unweighted averaging. Classifiers 2302(*a-n*) can be concatenated or hierarchical.

One embodiment of the invention includes a DPNC VPN classifier that operates on the features found in the packets and packet metadata and the various functional and statistical metrics of features processed over the flows, sensors, and session. The classifier can determine if a proxy is detected (yes/no or true/false) and the result may include a confidence score or risk score. The score may be scaled to 0 to 1 (0% to 100%) or another numeric threshold, e.g., <=0; >0, etc. The classifier may make the classification based on some, or all, of the metadata of the session, and may make an iterative classification a number of times as the metadata is processed and collected. Thus, it is not necessary for all the data from all the flows or sensors to be received before a classification and confidence level may be determined. In this way, incremental results can be used as soon as available, or when a timer expires, or when required or requested by the system. The classifier process may continue to operate until all the session data is received and processed. Incremental classification results may be presented to subsequent classifier layers, and/or written to the database incrementally up until and including to the final classification of the session is complete. Note that the upstream system may use an incremental update, perhaps due to time constraints, that is not the final classification.

Figure 24:
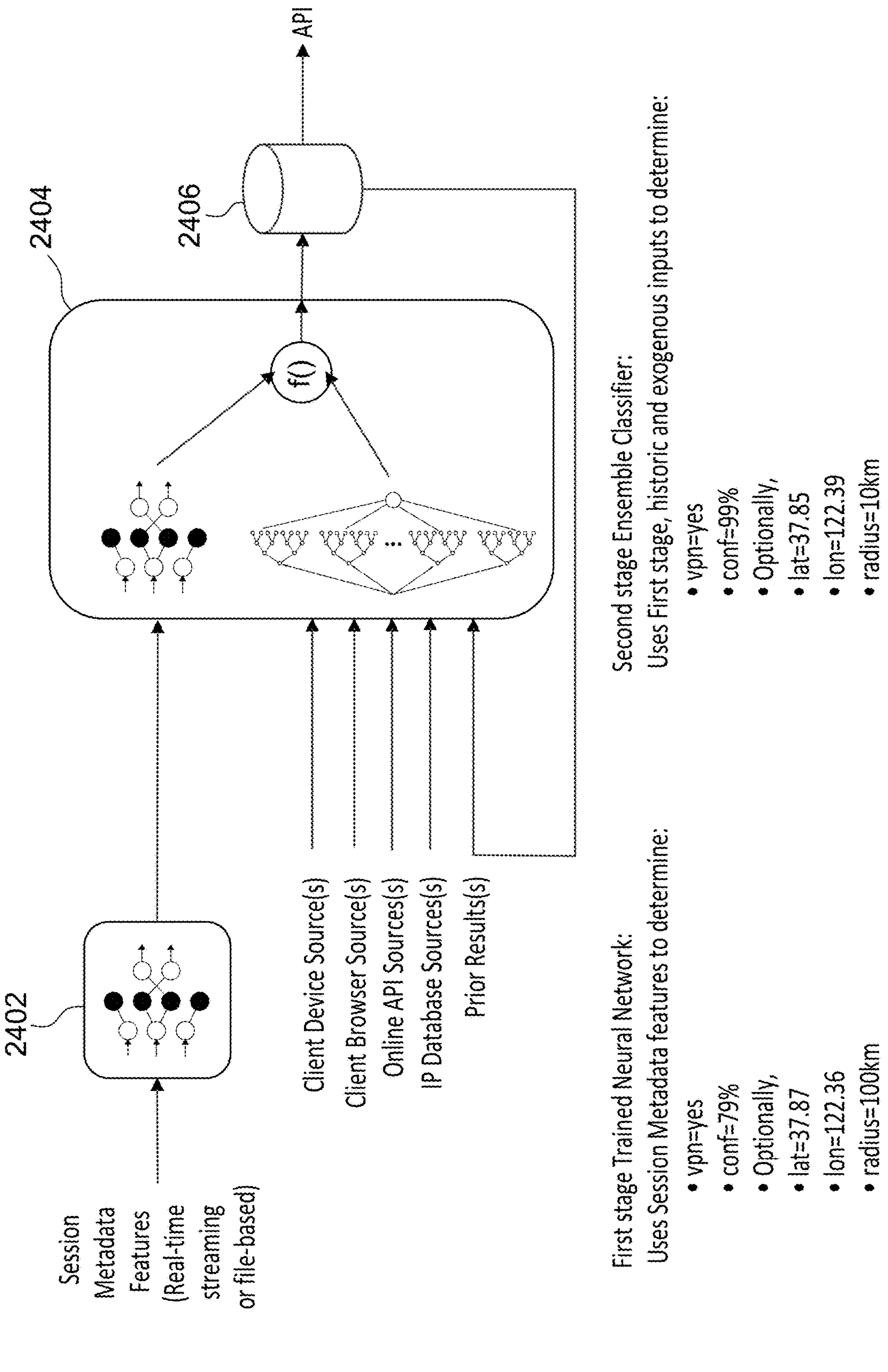
FIG. 24 is a diagram illustrating DPNC according to embodiments of the present invention, with a multi-stage neural network where the first stage Neural Network makes a VPN decision and scoring using the packet metadata performed potentially at the network sensor and forwarded to and subsequent stage(s) where learning systems process the aggregate and include input from exogenous information.

FIG. 24 is a diagram illustrating an embodiment of the invention utilizing a multi-stage classifier. The first stage is a Neural Network 2402 that makes VPN classification decision using the session metadata features. Subsequent stage(s) 2404 include input from exogenous information, client device (e.g., GPS), client browser, Online APIs, IP databases, and prior results, etc., as inputs to one or more of trained neural network(s), trained decision tree(s), and heuristic(s) to generate a decision and risk score as a function of the ensemble of results where the function may be a weighted average, majority vote, etc. which may be stored in a database 2406, accessible via an API.

The combination of the Neural Networks (or decision trees) into a multi-stage proxy detection process distributes the decision load and incorporates feedback and other ancillary metadata to achieve a higher level of accuracy than a single stage that uses the packet metadata alone in its classification or confidence level scoring.

Exemplary results stage results are shown in the figure. In this example, a first stage trained Neural Network may use Session Metadata features to determine:

i. VPN=true
ii. Confidence=79%
iii. Optional:
iv. Latitude=37.87
v. Longitude=−122.36
vi. Radius=100 km A second stage Ensemble Classifier may use first stage, historic, and exogenous inputs to refine the data to the following results:

i. VPN=true
ii. Confidence=99%
iii. Optional geolocation:
iv. Latitude=37.85
v. Longitude=−122.39
vi. Radius=10 km.

Figure 25:
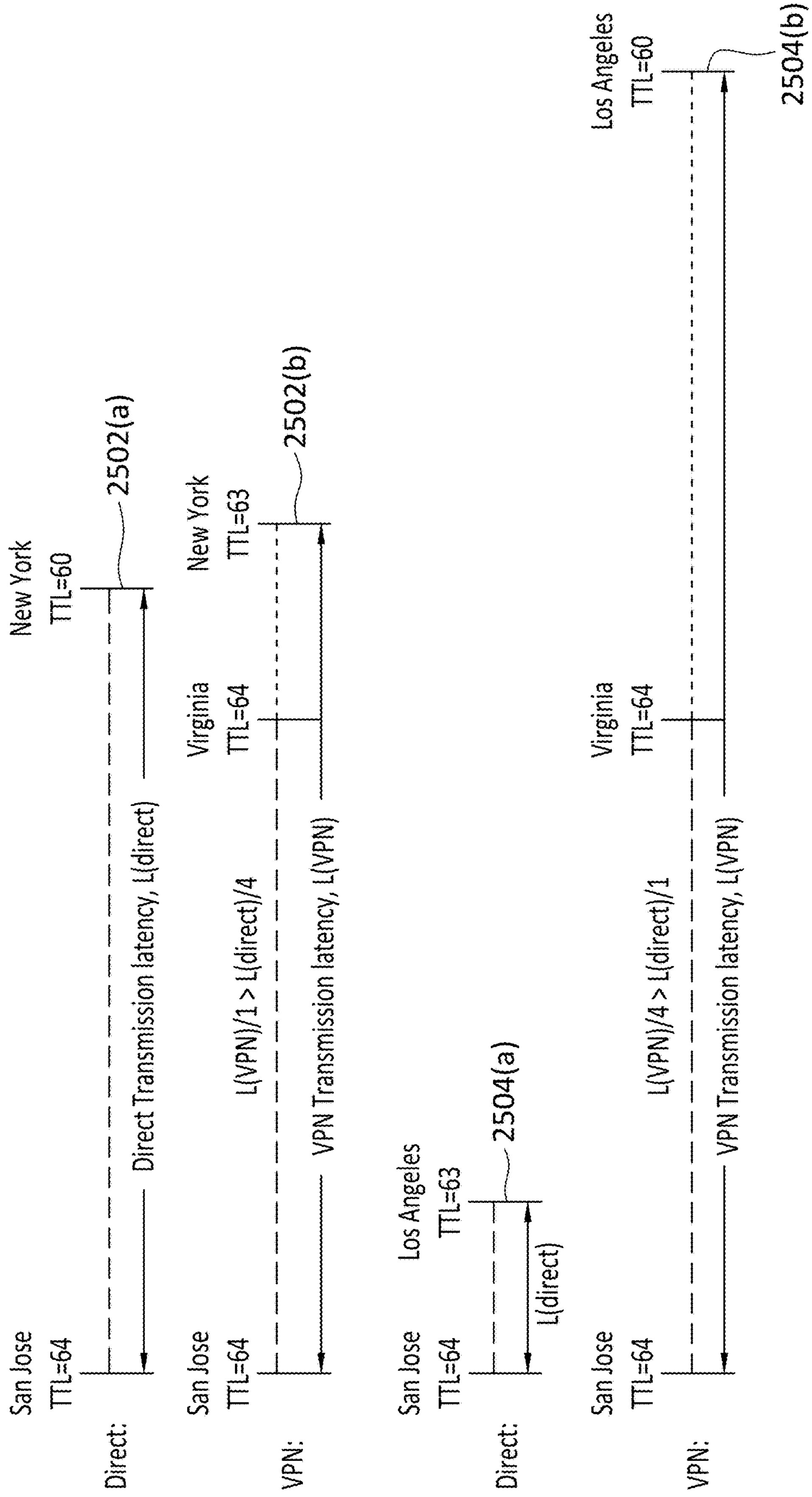
FIG. 25 is a diagram illustrating a comparison of client connections to a remote application with and without VPN tunnel cases, according to embodiments of the present invention.

FIG. 25 is a flow diagram that illustrates a comparison between tunneled and untunneled network paths according to embodiments of the invention. As shown in FIG. 25, a client connection 2502(*a*)-(*b*) from a laptop in San Jose via a home WiFi router to a webserver or application in New York, and similarly a connection 2504(*a*)-(*b*) to a Webserver or application running in Los Angeles.

Two cases (a) and (b) are shown for each connection. The direct access cases 2502(*a*) and 2504(*a*) are where the connections are not over VPN are shown with solid lines. The cases 2502(*b*) and 2504(*b*) where the client establishes a VPN tunnel to a VPN server in Virginia is shown in dashed lines.

As an example, in the direct access case 2502(*a*), a user accesses a web application using their laptop to sends IP packets via the subscriber's home WiFi router that may then forwards them over the internet via routers in Salt Lake City, Denver, Chicago and then to the webserver in New York. Along its journey, the IP packets in this case encounter a total of 5 routers and therefore, the IP packet arrives at the New York endpoint with a Time-To-Live (TTL) that has been decremented by 5. Similarly, in direct access case 2504(*a*), packets to a Webserver in Los Angeles result in the packet's IP TTL decremented by 1. However, in the case of the VPN tunnel from the client to the VPN server in Virginia 2504(*b*), the IP packets from the client are tunneled all the way to Virginia where they egress from the VPN server with the originating TTL. The VPN server then forwards them via a router in Virginia to New York with the TTL decremented only by 1. Client packets destined to Los Angeles 2504(*b*) also egress the VPN tunnel in Virginia and are then forwarded by routers in Atlanta, Dallas, Phoenix and then to the endpoint in Los Angeles. Upon arrival in Los Angeles, these packets have their TTL decremented by 4. The TTL values for the direct cases 2502(*a*) and 2504(*a*) are consistent with a client in San Jose. The TTL values in the VPN cases 2502(*b*) and 2504(*b*) are consistent with a VPN client in Virginia. In essence, the TTL gives the appearance that the VPN client is in Virginia.

One key difference between a client physically located in Virginia connecting to a server in New York, versus a VPN client in San Jose transiting a tunnel to Virginia and then connecting to New York, is the round-trip time (RTT).

The VPN/proxy tunnel impacts the behavior of the client's connection resulting in different packets counts and packet sizes, loss, latency, jitter, TTL and other fields. According to embodiments of the invention, the proxy detection process is trained to distinguish tunneled traffic from non-tunneled traffic based on these tells.

Figure 26:
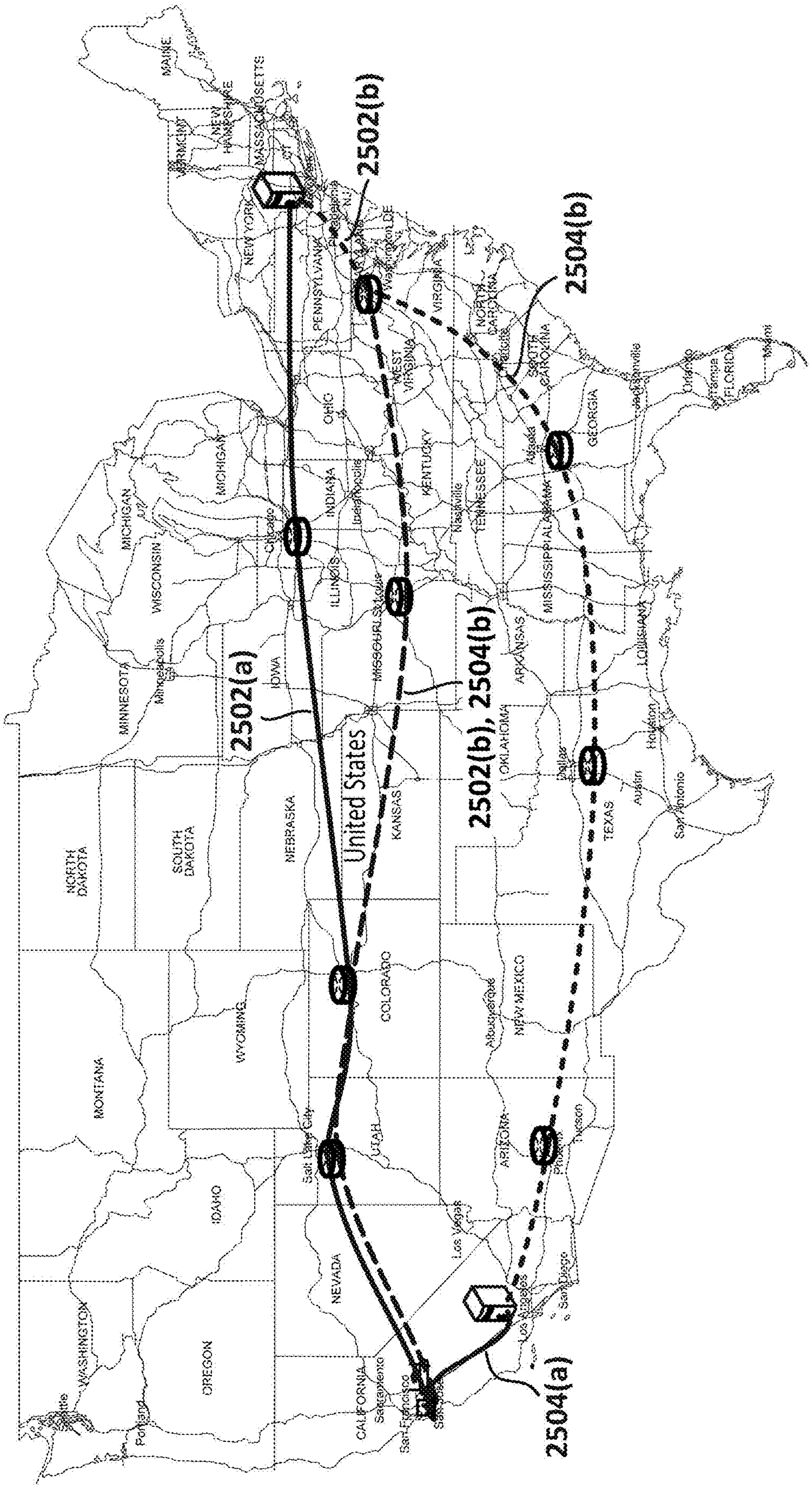
FIG. 26 is a map illustrating a difference in latency per hop for a direct connection versus a tunneled connection.

FIG. 26 is a map illustrating the difference in latency for an untunneled connections 2502(*a*) and 2504(*a*) versus a tunneled connections 2502(*b*) and 2504(*b*) as per the topology shown in FIG. 25, according to embodiments of the invention. Note that the minimum time that it takes a packet to physically travel from San Jose to New York is bounded by the minimum time it physically takes the packet to first reach Virginia and then be forwarded to New York. This latency is typically much longer than for an untunneled connection from a client physically located in Virginia. Although both untunneled and tunneled connections have their TTL decremented by one, the increased ratio of the RTT to TTL decrement, or latency per hop, is a potential indicator of the presence of the VPN tunnel. Similarly, an untunneled access from the client in Virginia to a server in Los Angeles will see roughly one half the latency in comparison to a packet that was tunneled across the country from San Jose to Virginia and then forwarded back to Los Angeles resulting. Although in both untunneled and tunneled cases there are 4 hops (TTL decremented by 4), the latency per hop for the VPN tunneled packet is likely to be about double that expected for untunneled connection from Virginia to Los Angeles. The latency per hop metric is a ratio of two raw metrics that can be considered a new "functional" feature for use in machine learning constructs such as neural network (or decision tree, etc.). By functional we mean that the feature is a mathematical or logical function of one or more raw features. A multiplicity of measurements of functional features may be computed to derive a number of "statistical" metrics, e.g., minimum, mean, median, maximum, variance, or histogram of values over the set of measurements. Functional and statistical metrics may be computed over any subset of full set of packets, flows (flow metrics), client-sensor pair (sensor metrics), or over the entire session (session metrics), e.g., one such session metric may be the minimum latency per hop computed over all the sensors for the entire session.

It has been observed that the VPN/proxy tunnel impacts the behavior of the client's connection resulting in different packets counts and packet sizes, loss, latency, jitter, TTL and other packet fields and protocol behavior. According to embodiments of the present invention, the proxy detection process is trained to distinguish tunneled traffic from non-tunneled traffic using these tells.

While embodiments of the invention have been disclosed above, various modifications to the example embodiments will be readily apparent to those skilled in the art, and the generic principles defined herein may be applied to other embodiments and applications without departing from the spirit and scope of the invention.

Moreover, in this description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

What is claimed is:

1. A system for detecting proxied network connections (DPNC), comprising:

a plurality of network sensors coupled with an electronic data network and configured to receive network traffic including packets for at least a first network connection and a second network connection, to extract metadata features from said packets, and to transmit the extracted metadata features;

a software module adapted to be initiated by a client device and to generate network traffic from said client device to one or more of said plurality of network sensors;

a first server configured to receive said extracted metadata features, to store the extracted metadata features in a database, to analyze said extracted metadata features and to determine whether said second network connection was proxied based on a comparison of at least one of said extracted metadata features with an expected metadata feature, and to generate an indicator indicating a likelihood that said network connection is proxied; and a second server coupled with the electronic data network, and configured to access the database, wherein the plurality of network sensors are disposed outside of the client device.

2. The system as recited by claim 1, wherein said first server is configured to determine whether said second network connection was proxied based at least on a calculation of latency for the packets relating to said second network connection and a comparison of the calculated latency with an expected latency.

3. The system as recited by claim 1, wherein said first server is configured to use a single stage or a multi-stage classification with a neural network or decision tree to determine whether said second network connection was proxied.

4. The system as recited by claim 1, wherein said metadata features for each packet include at least one of Layer 3 IP fields, Layer 4 fields, and application layer fields, a timestamp for a packet observation, and a direction of the packet.

5. The system as recited in claim 1, wherein the first server is configured to compute additional metadata features according to states of at least one of a Transmission Control Protocol (TCP) and TCP flow from the network layer to the application layer.

6. The system as recited in claim 5, wherein the first server is further configured to compute metadata features for one or more flows of a client-sensor connection, including inter-flow latency.

7. The system as recited in claim 5, wherein the first server is further configured to compute metadata features for one or more flows of each of the plurality of network sensors for a session.

8. The system as recited in claim 7, wherein said client device is connected to a web server, and said software module is embedded in web page accessed by said client device and configured to be initiated by the web page on the client device to generate network traffic to one or more of said plurality of network sensors;

wherein said software module causes said client device to generate an HTTPS GET REQUEST directed to at least one of said plurality of network sensors, and said network sensors are configured to extract metadata features of each packet associated with the HTTPS GET REQUEST and store said extracted metadata features in said database; and wherein said first server is configured to determine whether said second network connection was proxied based at least on a calculation of latency for the packets relating said HTTPS GET REQUEST and a comparison of the calculated latency with an expected latency for an unproxied connection.

9. The system as recited in claim 1, wherein the second server is a web server, said client device is connected to the web server, and said software module is embedded in a web page accessed by said client device and configured to be initiated by the web page on the client device to generate network traffic to one or more of said plurality of network sensors.

10. The system as recited in claim 1, wherein said software module causes said client device to generate an HTTPS GET REQUEST directed to at least one of said plurality of network sensors, and said network sensors are configured to extract metadata features of each packet associated with the HTTPS GET REQUEST and store said extracted metadata features in said database.

11. The system as recited in claim 10, wherein said software module causes said client device to repeat said HTTPS GET REQUEST a number of times.

12. The system as recited in claim 11, wherein each network sensor is configured to respond to said HTTPS GET REQUEST with a redirect.

13. The system as recited in claim 11, wherein said network sensors are each configured to extract said metadata features for individual packets, TCP handshakes, Secure Sockets Layer/Transport Layer Security (SSL/TLS) handshakes relating to the HTTPS GET REQUEST.

14. The system as recited in claim 1, wherein said client device is connected to an application server, and said software module is embedded in an application accessed by said client device and configured to be initiated by access to the application by the client device to generate network traffic from said client device to one or more of said plurality of network sensors.

15. The system as recited in claim 14, wherein said application server is configured to extract metadata features from packet flows relating to execution of an application on said application server by said client device, and to store said metadata features in said database.

16. The system as recited in claim 1, wherein a unique session ID is generated using IP address, IP protocol, and transport layer port fields to distinguish network flows.

17. The system as recited in claim 1, wherein said indicator is a score.

18. The system as recited in claim 1, wherein said software module is a JavaScript library.

19. The system as recited in claim 1, wherein said plurality of network sensors are configured to store said extracted metadata features in a database, and said first server is coupled with said database and configured to access said stored metadata features.

20. A system for detecting proxied network connections (DPNC), comprising:

a plurality of network sensors coupled with an electronic data network and configured to receive network traffic including packets for a network connection, to extract metadata features from said packets, and to transmit the extracted metadata features;

a software module adapted to be initiated by a client device and to generate network traffic from said client device to one or more of said plurality of network sensors; and a server configured to receive said extracted metadata features, to analyze said extracted metadata features and to determine whether said network connection was proxied based on a comparison of at least one of said extracted metadata features with an expected metadata feature, and to generate an indicator indicating a likelihood that said network connection is proxied, wherein said server is configured to use a single stage or a multi-stage classification with a neural network or decision tree to determine whether said network connection was proxied.

* * * * *